US009899028B2

(12) United States Patent  
Nakadai et al.

(10) Patent No.: US 9,899,028 B2  
(45) Date of Patent: Feb. 20, 2018

(54) INFORMATION PROCESSING DEVICE, INFORMATION PROCESSING SYSTEM, INFORMATION PROCESSING METHOD, AND INFORMATION PROCESSING PROGRAM

(71) Applicant: HONDA MOTOR CO., LTD., Tokyo (JP)

(72) Inventors: Kazuhiro Nakadai, Wako (JP); Takeshi Mizumoto, Wako (JP); Keisuke Nakamura, Wako (JP); Masayuki Takigahira, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/826,527

(22) Filed: Aug. 14, 2015

(65) Prior Publication Data

US 2016/0055850 A1    Feb. 25, 2016

(30) Foreign Application Priority Data

Aug. 21, 2014  (JP) .................................. 2014-168632  
Apr. 14, 2015  (JP) .................................. 2015-082359

(51) Int. Cl.

| | |
|---|---|
| *G06F 15/00* | (2006.01) |
| *G10L 15/00* | (2013.01) |
| *G10L 15/26* | (2006.01) |
| *G10L 25/00* | (2013.01) |
| *G10L 15/32* | (2013.01) |

(52) U.S. Cl.  
CPC .................................... *G10L 15/32* (2013.01)

(58) Field of Classification Search  
None  
See application file for complete search history.

(56) References Cited

U.S. PATENT DOCUMENTS

| | | | | |
|---|---|---|---|---|
| 5,970,446 | A  * | 10/1999 | Goldberg ................ | G10L 15/20 704/233 |
| 8,521,539 | B1 * | 8/2013 | Teng ................... | G01C 21/3608 701/418 |
| 8,949,266 | B2 * | 2/2015 | Phillips .................... | G10L 15/30 704/7 |
| 9,183,843 | B2 * | 11/2015 | Fanty ...................... | G10L 21/00 |
| 9,620,122 | B2 * | 4/2017 | VanBlon ................. | G10L 15/32 |

(Continued)

FOREIGN PATENT DOCUMENTS

| | | |
|---|---|---|
| JP | 2000-181485 | 6/2000 |
| JP | 2011-180590 | 9/2011 |

*Primary Examiner* — Paras D Shah  
*Assistant Examiner* — Thuykhanh Le  
(74) *Attorney, Agent, or Firm* — Rankin, Hill & Clark LLP

(57) ABSTRACT

An information processing device includes a first information processing unit, a communication unit, and a control unit. The first information processing unit performs predetermined information processing on input data to generate first processing result data. The communication unit is capable of receiving second processing result data generated by a second information processing unit capable of executing the same kind of information processing as the information processing on the input data under a condition with higher versatility. The control unit selects either the first processing result data or the second processing result data according to the use environment of the device.

4 Claims, 9 Drawing Sheets

(56) References Cited

U.S. PATENT DOCUMENTS

| | | | |
|---|---|---|---|
| 2002/0055845 A1* | 5/2002 | Ueda | G10L 15/32 704/270 |
| 2002/0143540 A1* | 10/2002 | Malayath | G10L 15/07 704/255 |
| 2003/0061042 A1* | 3/2003 | Garudadri | G10L 15/30 704/254 |
| 2005/0080625 A1* | 4/2005 | Bennett | G06F 17/3043 704/249 |
| 2006/0009980 A1* | 1/2006 | Burke | G10L 15/30 704/270 |
| 2009/0234651 A1* | 9/2009 | Basir | G10L 15/02 704/254 |
| 2010/0036660 A1* | 2/2010 | Bennett | G10L 15/30 704/231 |
| 2010/0057450 A1* | 3/2010 | Koll | G10L 15/30 704/231 |
| 2011/0054894 A1* | 3/2011 | Phillips | G10L 15/07 704/235 |
| 2011/0054895 A1* | 3/2011 | Phillips | G10L 15/075 704/235 |
| 2011/0054896 A1* | 3/2011 | Phillips | G10L 15/30 704/235 |
| 2011/0054897 A1* | 3/2011 | Phillips | G10L 15/20 704/235 |
| 2011/0054898 A1* | 3/2011 | Phillips | G10L 15/30 704/235 |
| 2011/0054899 A1* | 3/2011 | Phillips | G10L 15/142 704/235 |
| 2011/0054900 A1* | 3/2011 | Phillips | G10L 15/30 704/235 |
| 2011/0060587 A1* | 3/2011 | Phillips | G10L 15/30 704/235 |
| 2011/0307251 A1* | 12/2011 | Tashev | G10L 21/028 704/231 |
| 2011/0307254 A1* | 12/2011 | Hunt | G10L 15/26 704/235 |
| 2012/0095761 A1* | 4/2012 | Nakadai | G10L 15/20 704/233 |
| 2012/0179457 A1* | 7/2012 | Newman | G10L 15/32 704/201 |
| 2012/0179471 A1* | 7/2012 | Newman | G10L 15/32 704/270.1 |
| 2012/0215528 A1* | 8/2012 | Nagatomo | G10L 15/30 704/211 |
| 2012/0253823 A1* | 10/2012 | Schalk | G01C 21/3608 704/270.1 |
| 2013/0132086 A1* | 5/2013 | Xu | G10L 15/01 704/257 |
| 2013/0132089 A1* | 5/2013 | Fanty | G10L 21/00 704/270 |
| 2013/0151250 A1* | 6/2013 | VanBlon | G10L 15/32 704/235 |
| 2013/0272548 A1* | 10/2013 | Visser | G06K 9/00624 381/122 |
| 2014/0163977 A1* | 6/2014 | Hoffmeister | G10L 15/32 704/232 |
| 2014/0207442 A1* | 7/2014 | Ganong, III | H04W 12/02 704/201 |
| 2015/0066496 A1* | 3/2015 | Deoras | G10L 15/16 704/232 |
| 2015/0120288 A1* | 4/2015 | Thomson | G10L 15/30 704/231 |
| 2015/0127349 A1* | 5/2015 | Agiomyrgiannakis | G10L 15/142 704/266 |
| 2015/0279352 A1* | 10/2015 | Willett | G10L 15/30 704/231 |

* cited by examiner

FIG. 2
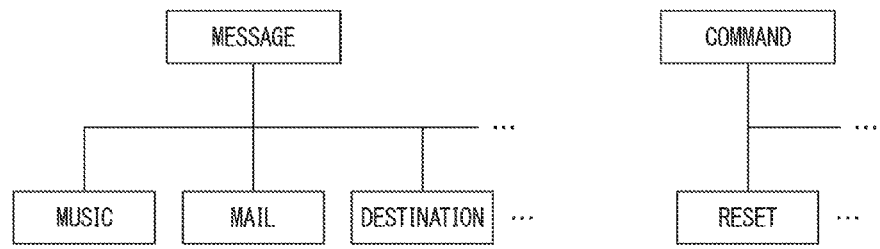
FIG. 3
| CLASSIFICATION | COMMAND | MESSAGE | | |
|---|---|---|---|---|
| EXAMPLE OF WORD (OR CATEGORY THEREOF) | RESET | MUSIC | MAIL | DESTINATION |
| FIRST TEXT DATA | ○ | ○ | × | ◎ |
| SECOND TEXT DATA | × | ◎ | ○ | ○ |
FIG. 4
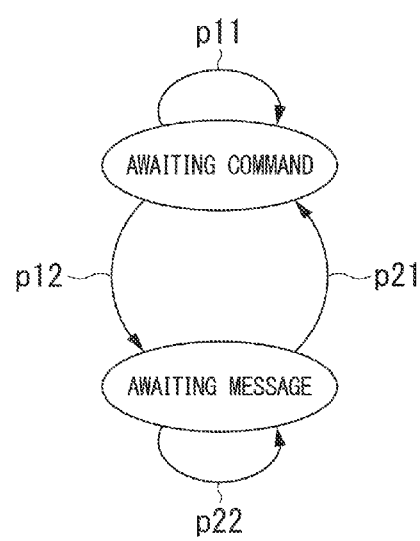

FIG. 8

| COMMUNICATION STATE INFORMATION | PROCESSING UNIT TO BE OPERATED | TRANSMISSION DATA |
|---|---|---|
| BAND 1, SHUT-DOWN 1 | NONE | (i) M-CHANNEL SPEECH SIGNALS |
| BAND 1, SHUT-DOWN 2 | SOUND SOURCE LOCALIZATION UNIT 112 | (ii) SOUND SOURCE DIRECTION INFORMATION, M-CHANNEL SPEECH SIGNALS |
| BAND 2, SHUT-DOWN 2 | SOUND SOURCE LOCALIZATION UNIT 112, SOUND SOURCE SEPARATION UNIT 113 | (iii) SOUND SOURCE-SPECIFIC SPEECH SIGNAL |
| BAND 3, SHUT-DOWN 2 | SOUND SOURCE LOCALIZATION UNIT 112, SOUND SOURCE SEPARATION UNIT 113, FEATURE QUANTITY CALCULATION UNIT 114 | (iv) ACOUSTIC FEATURE QUANTITY |
| SHUT-DOWN 3 | SOUND SOURCE LOCALIZATION UNIT 112, SOUND SOURCE SEPARATION UNIT 113, FEATURE QUANTITY CALCULATION UNIT 114, FIRST SPEECH RECOGNITION UNIT 116 | (v) NO TRANSMISSION DATA |

FIG. 10

| PROCESSING | SUITABILITY OF CLOUD PROCESSING |
|---|---|
| SPEECH RECOGNITION | LOW |
| SPEECH SYNTHESIS | HIGH |
| ELECTRONIC MAIL RECEPTION | MIDDLE |
| CONTENT DECODING | HIGH |

FIG. 11

| PROCESSING | UPLINK BAND (INPUT DATA) | DOWNLINK BAND (PROCESSING RESULT DATA) | SUITABILITY OF CLOUD PROCESSING |
|---|---|---|---|
| SPEECH RECOGNITION | BROAD (SPEECH SIGNAL) | NARROW (TEXT) | LOW |
| SPEECH SYNTHESIS | NARROW (TEXT) | BROAD (SPEECH SIGNAL) | HIGH |
| ELECTRONIC MAIL RECEPTION | NARROW (COMMAND DATA) | MIDDLE (MESSAGE) | MIDDLE |
| CONTENT DECODING | NARROW (CONTENT IDENTIFICATION INFORMATION) | BROAD (ACOUSTIC SIGNAL) | HIGH |

INFORMATION PROCESSING DEVICE, INFORMATION PROCESSING SYSTEM, INFORMATION PROCESSING METHOD, AND INFORMATION PROCESSING PROGRAM

CROSS-REFERENCE TO RELATED APPLICATIONS

This application claims priority on Japanese Patent Application No. 2014-168632, filed Aug. 21, 2014, and Japanese Patent Application No. 2015-082359, filed Apr. 14, 2015, the contents of which are incorporated herein by reference.

BACKGROUND OF THE INVENTION

Field of the Invention

The present invention relates to an information processing device, an information processing system, an information processing method, and an information processing program.

Background

Speech recognition is processing for converting the content of utterance indicated by recorded speech to machine-processable text information. It has been hitherto known that recognition accuracy is affected by various use environments. The use environments which affect recognition accuracy include the ambient acoustic environment, such as noise or reverberation, the purpose of speech recognition, and the like. A word dictionary is data which includes words to be candidates of recognition results, and may form part of data for speech recognition.

A use environment is different according to a scene or a situation in which speech recognition is used. For example, a vocabulary to be used is different according to the purpose of use of speech recognition, a field to be handled, or the like. When an operation of a predetermined instrument is intended, a vocabulary mainly including an operation command is enough; however, when a specific particular field is handled, a general-purpose word dictionary is not enough, and a vocabulary in that field is required. In addition, the level of noise, such as engine sound or air-conditioning sound, is generally higher in a vehicle interior than in an office; however, in many cases, a noise source is obvious in the vehicle interior. For this reason, it is not realistic to prepare various control parameters or databases which can be applied to all use environments.

Accordingly, it has been suggested that a speech recognition database to be used among a plurality of speech recognition databases set in advance is switched according to recognized words. For example, Japanese Unexamined Patent Application, First Publication No. 2000-181485 describes a speech recognition device which analyzes at least a part of input utterance data using a speech database and switches a speech database for use in analysis using a result obtained by analysis. The speech recognition device reanalyzes input utterance data by comparison with speech data in the switched speech database.

SUMMARY

In the speech recognition device described in Japanese Unexamined Patent Application, First Publication No. 2000-181485, a speech database includes dictionaries of a plurality of hierarchies. The dictionary of each hierarchy is data indicating a geographical name or a name of each of a national level, a perfectural level, and a municipal level. A geographical range of a geographical name or a name is different between the hierarchies, but is not different depending on the use environment. Therefore, an appropriate recognition result according to the use environment is not necessarily obtained.

An object of an aspect of the invention is to provide an information processing device, an information processing system, an information processing method, and an information processing program capable of improving usefulness according to the use environment.

(1) An aspect of the invention is an information processing device including: a first information processing unit which performs predetermined information processing on input data to generate first processing result data; a communication unit which is capable of receiving second processing result data generated by a second information processing unit capable of executing the same kind of information processing as the information processing on the input data under a condition with higher versatility; and a control unit which selects either the first processing result data or the second processing result data according to the use environment of the device.

(2) In the aspect of (1) described above, the first information processing unit may be a first speech recognition unit which performs speech recognition on an input speech signal using first speech recognition data to generate first text data, the second information processing unit may be a second speech recognition unit which performs speech recognition on the speech signal using second speech recognition data with higher versatility than the first speech recognition data to generate second text data, the communication unit may be capable of receiving the second text data from the second speech recognition unit, and the control unit may select either the first text data as the first processing result data or the second text data as the second processing result data.

(3) In the aspect of (2) described above, the control unit may select either the first text data or the second text data based on words included in the first text data or the second text data.

(4) In the aspect of (2) or (3) described above, the control unit may determine whether or not to select the second text data based on words included in the second text data when the first text data is selected, and may determine whether or not to select the first text data based on words included in the first text data when the second text data is selected.

(5) In the aspect of any one of (2) to (4) described above, the control unit may determine whether or not to operate the first speech recognition unit based on a communication state with the second speech recognition unit.

(6) In the aspect of (5) described above, the information processing device may include a first preprocessing unit which performs pre-processing on the speech signal to generate a first acoustic feature quantity. The first speech recognition unit may generate the first text data based on the first acoustic feature quantity. The first preprocessing unit may include hierarchical processing units of L (where L is a prescribed integer equal to or greater than 1) hierarchies. An m-th (where m is an integer equal to or greater than 1 and equal to or less than L) hierarchical processing unit may perform an m-th hierarchical processing on m-th hierarchical data to generate (m+1)th hierarchical data, first hierarchical data may be the speech signal, and (L+1)th hierarchical data may be the first acoustic feature quantity. The control unit may determine to which hierarchy of hierarchical processing unit the operation is allowed according to the communication state.

(7) In the aspect of (6) described above, L may be 3, a first hierarchical processing unit may be a sound source localization unit which calculates a sound source direction of each sound source from a speech signal of a plurality of channels, a second hierarchical processing unit may be a sound source separation unit which separates the speech signal of the plurality of channels into sound source-specific speech signals of each of the sound sources, and a third hierarchical processing unit may be a feature quantity calculation unit which calculates acoustic feature quantities from the sound source-specific speech signals.

(8) In the aspect of any one of (1) to (7) described above, the control unit may determine whether or not to allow the second information processing unit to perform the information processing based on the amount of information of the input data and the amount of information of processing result data generated by the information processing.

(9) In the aspect of (8) described above, the control unit may allow the first information processing unit to perform speech recognition as the information processing and may allow the second information processing unit to perform speech synthesis, content decoding, or electronic mail reception as the information processing.

(10) Another aspect of the invention is an information processing system including a first information processing device; and a second information processing device. The first information processing device includes: a first information processing unit which performs predetermined information processing on input data to generate first processing result data; a communication unit which is capable of receiving second processing result data from the second information processing device; and a control unit which selects either the first processing result data or the second processing result data according to the use environment of the device. The second information processing device includes: a second information processing unit which executes the same kind of information processing as the information processing on the input data under a condition with higher versatility to generate the second processing result data.

(11) Still another aspect of the invention is an information processing method in an information processing device, the method including: performing predetermined information processing on input data to generate first processing result data; receiving second processing result data generated by a second information processing unit capable of executing the same kind of information processing as the information processing on the input data under a condition with higher versatility; and selecting either the first processing result data or the second processing result data according to the use environment of the device.

(12) A further aspect of the invention is a non-transitory computer-readable recording medium including an information processing program which causes a computer of an information processing device to execute: performing predetermined information processing on input data to generate first processing result data; receiving second processing result data generated by a second information processing unit capable of executing the same kind of information processing as the information processing on the input data under a condition with higher versatility; and selecting either the first processing result data or the second processing result data according to the use environment of the device.

According to the configuration of (1), (10), (11), or (12) described above, either the first processing result data acquired by the device or the second processing result data executed under a condition with higher versatility and received from another device is selected according to the use environment of the device. For this reason, it is possible to improve usefulness by utilizing processing resources of another device according to the use environment of the device.

According to the configuration of (2) described above, either the first text data acquired by the device or the second text data recognized using speech recognition data with high versatility and received from another device is selected according to the use environment of the device. For this reason, it is possible to improve recognition accuracy by utilizing processing resources of another device according to the use environment of the device.

According to the configuration of (3) described above, text data recognized using more appropriate speech recognition data is selected according to the words forming the content of utterance. For this reason, it is possible to perform appropriate speech recognition according to the purpose of use or the field.

According to the configuration of (4) described above, the selection of either the first text data or the second text data is determined based on text data not selected currently. For this reason, appropriate text data is selected according to changes of the purpose of use or the field, whereby it is possible to improve recognition accuracy.

According to the configuration of (5) described above, whether to operate the first speech recognition unit of the device or to receive the second text data acquired using speech recognition data with high versatility with the second speech recognition unit is selected according to the communication state with the second speech recognition unit. For this reason, it is possible to improve recognition accuracy by utilizing the processing resources according to the communication state with the second speech recognition unit.

According to the configuration of (6) described above, the hierarchy of a hierarchical processing unit to be operated among the hierarchical processing units constituting the first preprocessing unit is variable according to the communication state. For this reason, it is possible to appropriately control the degree of utilization of processing resources relating to the second speech recognition unit according to the communication state.

According to the configuration of (7) described above, the hierarchy of a processing unit to be operated among the sound source localization unit, the sound source separation unit, and the feature quantity calculation unit constituting the first preprocessing unit is variable according to the communication state. In addition, the amount of information of generated data becomes smaller in the order of the sound source localization unit, the sound source separation unit, and the feature quantity calculation unit. For this reason, it is possible to control the degree of utilization of processing resources relating to the second speech recognition unit according to the communication state appropriate for the amount of information of data generated in each unit.

According to the configuration of (8) described above, the usability of the second information processing unit is determined according to the fact that the degree of effective utilization of the second information processing unit in another device connected to a network may be different depending on the classification of information processing. For this reason, it is possible to clearly determine whether or not to use the second information processing unit for each type of information processing.

According to the configuration of (9) described above, speech synthesis, content decoding, or electronic mail reception is executed with the second information processing unit as information processing which may use the second information processing unit rather than the first information processing unit, and speech recognition is executed with the first information processing unit as information processing which may use the first information processing unit more effectively than the second information processing unit. For this reason, usefulness is improved as the whole of the information processing system.

BRIEF DESCRIPTION OF THE DRAWINGS

FIG. 2 is a diagram showing a classification of a word and an example thereof.

FIG. 3 is a priority table showing text data to be employed for each classification of a word and an example of a priority thereof.

FIG. 4 shows an example of a state transition diagram of a control state in a control unit according to the first embodiment of the invention.

FIG. 8 is data showing an example of a selection table according to the second embodiment of the invention.

FIG. 10 is a table showing an example of suitability data according to the third embodiment of the invention.

FIG. 11 is a table showing an example of the amount of information of input data and processing result data and suitability of cloud processing.

DESCRIPTION OF THE EMBODIMENTS

First Embodiment

Figure 1:
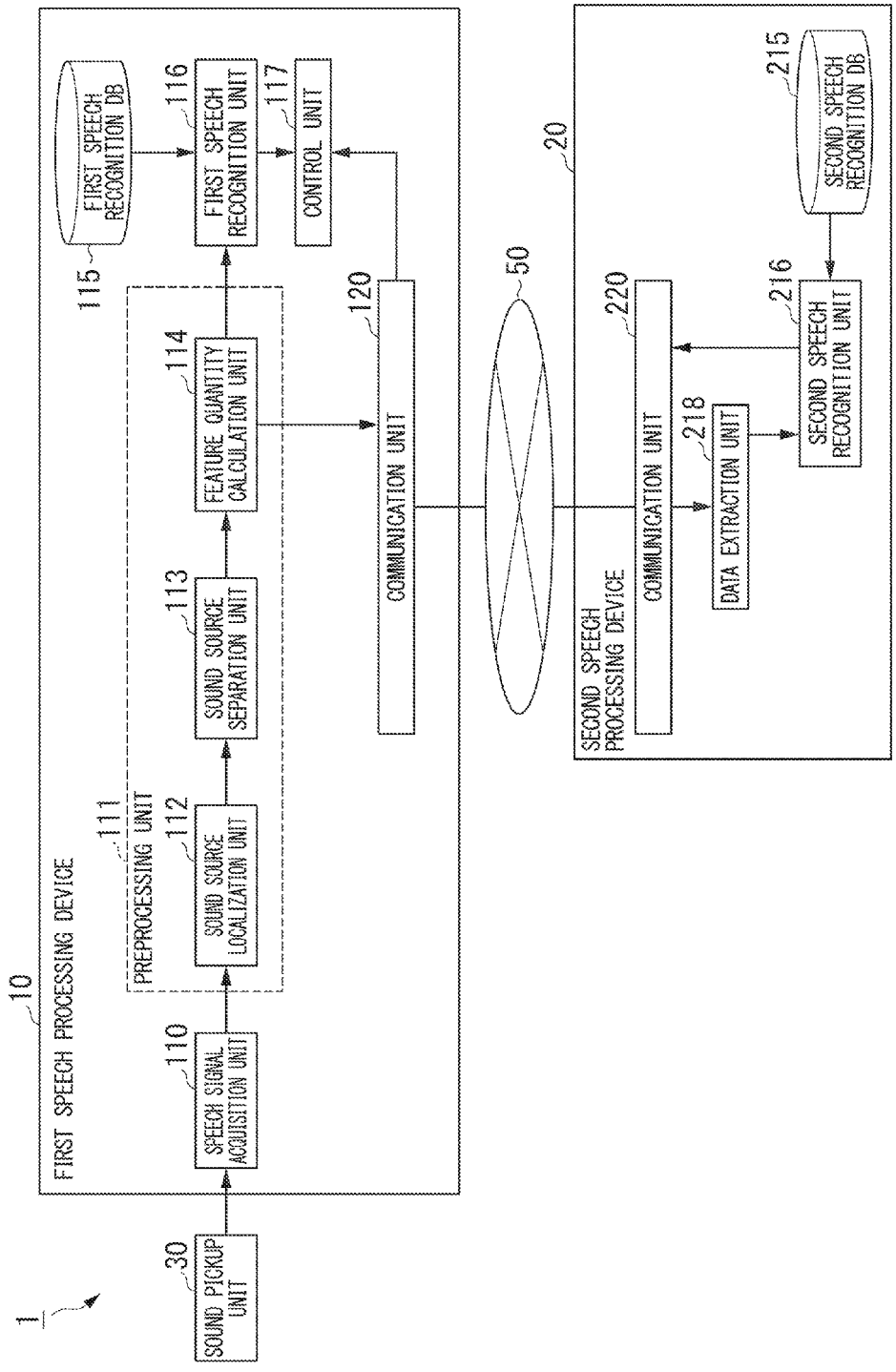
FIG. 1 is a block diagram showing the configuration of a speech processing system according to a first embodiment of the invention.

Hereinafter, a first embodiment of the invention will be described referring to the drawings.

FIG. 1 is a block diagram showing the configuration of a speech processing system 1 according to this embodiment.

The speech processing system 1 includes a first speech processing device 10, a second speech processing device 20, and a sound pickup unit 30. The first speech processing device 10 and the second speech processing device 20 are connected through a network 50 and can transmit and receive data to and from each other.

The first speech processing device 10 performs speech recognition on a speech signal acquired from the sound pickup unit 30 using first speech recognition data to generate first text data, and receives second text data from the second speech processing device 20. The first speech processing device 10 selects either the first text data or the second text data according to the use environment of the device.

The use environment includes, for example, application software (hereinafter, simply referred to as "application") which is executed with the first speech processing device 10, the state of noise, reverberation, or the like in a space where the first speech processing device 10 is used, a communication channel relating to transmission and reception of data with the second speech processing device 20, the state thereof, and the like.

The first speech processing device 10 is, for example, a terminal device, such as a multi-function mobile phone (including a so-called smartphone), a tablet terminal device, or a personal computer (PC).

The second speech processing device 20 performs speech recognition on the speech signal acquired by the first speech processing device 10 using second speech recognition data with higher versatility than the first speech recognition data to generate the second text data, and transmits the generated text data to the first speech processing device 10.

The second speech processing device 20 is, for example, a server device, such as a Web server or a database server.

The sound pickup unit 30 picks up sound incoming to the sound pickup unit 30, and generates a speech signal of M channels (where M is an integer equal to or greater than 1) based on the picked-up sound. The sound pickup unit 30 is, for example, a microphone array including M microphones. The sound pickup unit 30 transmits the generated speech signal to the first speech processing device 10. The sound pickup unit 30 may transmit the generated speech signal in a wireless manner or in a wired manner. The sound pickup unit 30 may be integrated with or separate from the first speech processing device 10.

The network 50 may be, for example, one of a wide area network (WAN), such as the Internet or a public land mobile network (PLMN), a local area network (LAN), a dedicated line, and the like.

(First Speech Processing Device)

Next, the configuration of the first speech processing device 10 will be described.

The first speech processing device 10 includes a speech signal acquisition unit 110, a preprocessing unit 111, a first speech recognition database (DB) 115, a first speech recognition unit 116, a control unit 117, and a communication unit 120.

The speech signal acquisition unit 110 outputs the speech signal of the M channels input from the sound pickup unit 30 to the preprocessing unit 111. The speech signal acquisition unit 110 is, for example, a data input/output interface.

The preprocessing unit 111 performs preprocessing on the speech signal input from the speech signal acquisition unit 110, and outputs preprocessing data (for example, acoustic feature quantity data) acquired by the preprocessing to the first speech recognition unit 116. The preprocessing unit 111 includes a sound source localization unit 112, a sound source separation unit 113, and a feature quantity calculation unit 114.

The sound source localization unit 112 calculates the direction of each sound source based on the speech signal of the M channels input from the speech signal acquisition unit 110 for every time (for example, 50 ms) having a length determined in advance. The sound source localization unit 112 uses, for example, a multiple signal classification (MUSIC) method in the calculation of the sound source direction. The MUSIC method will be described below. The sound source localization unit 112 outputs sound source direction information indicating the calculated sound source direction of each sound source and the speech signal of the M channels to the sound source separation unit 113.

The speech signal of the M channels and the sound source direction information are input to the sound source separation unit 113 from the sound source localization unit 112. The sound source separation unit 113 separates the speech signal of the M channels into sound source-specific speech signals of sound sources based on the sound source directions indicated by the sound source direction information. The sound source separation unit 113 uses, for example, a geometric-constrained high-order decorrelation-based source separation (GHDSS) method. The GHDSS method will be described below. The sound source separation unit 113 outputs the separated sound source-specific speech signals of the sound sources to the feature quantity calculation unit 114.

The feature quantity calculation unit 114 calculates acoustic feature quantities indicating physical features of the speech signals for the sound source-specific speech signals of the sound sources input from the sound source separation unit 113 at a predetermined time interval (for example, 10 ms). The acoustic feature quantities include, for example, a 13-dimensional mel-scale logarithmic spectrum (MSLS). One set of acoustic feature quantities may include a 13-dimensional delta MSLS or delta power. The delta MSLS is the difference of the MSLS of a previous frame (previous time) from the MSLS of a frame (present time) at this time. The delta power is the difference of the power at the previous time from the power at the present time. The acoustic feature quantities are not limited thereto, and may be, for example, mel-frequency cepstrum coefficients (MFCC). The feature quantity calculation unit 114 outputs the calculated acoustic feature quantities to the first speech recognition unit 116 and the communication unit 120.

The first speech recognition DB 115 stores various kinds of data as the first speech recognition data for use in speech recognition processing in advance. The first speech recognition data includes, for example, an acoustic model, a language model, and a word dictionary. The acoustic model is data which is used when recognizing phonemes from the acoustic feature quantities. The language model is data which is used when recognizing a plurality of word sets from a phoneme string having a plurality of adjacent phonemes. The word dictionary is data which indicates words as candidates of a phoneme string forming text data to be a recognition result. The acoustic model is, for example, a continuous hidden Markov model (HMM). The continuous HMM is a model in which an output distribution density is a continuous function, and the output distribution density is represented by weighted addition with a plurality of normal distributions as a base. The language model is, for example, an N-gram which indicates a restriction of a phoneme string having phonemes following a certain phoneme, or a transition probability of each phoneme string.

The first speech recognition unit 116 performs speech recognition processing on the acoustic feature quantities input from the feature quantity calculation unit 114 using the first speech recognition data stored in the first speech recognition DB 115 to generate the first text data indicating the content of utterance.

The first speech recognition unit 116 recognizes phonemes using the acoustic model in the first speech recognition data for the acoustic feature quantities. The first speech recognition unit 116 recognizes words using the word dictionary for a phoneme string in time-series of the recognized phoneme. The first speech recognition unit 116 recognizes a sentence indicating the content of utterance using the language model for a word string having the recognized words. The first speech recognition unit 116 generates the first text data indicating the recognized content of utterance and outputs the generated first text data to the control unit 117.

The control unit 117 controls various kinds of processing which are performed in the first speech processing device 10. For example, an application instructed by the first text data is executed to exert the functions of the first speech processing device. Examples of the functions include document preparation in electronic mail, document editing, or the like, route search (navigation) from a present position to a destination, reproduction of various contents, such as music or video, and the like. That is, the first text data may primarily include words to be an object or a purpose of an operation, such as words used for document preparation, words (geographical names and the like) used for an instruction of a destination, contents (captions and the like) to be reproduced, and words forming a sentence. In the following description, the words or a sentence including the words is generally referred to as a "message". In addition, the first text data may include words indicating a command for controlling each of various operations of the application, for example, operation start, end, and reset. In the following description, the words or a sentence including the words is generally referred to as a "command".

The control unit 117 receives the second text data from the second speech processing device 20 through the network 50 and the communication unit 120. The second text data also includes a message or a command. When realizing the function, the control unit 117 determines whether the first text data or the second text data is employed based on a classification of a word included therein, for example, whether a classification of a word is a message or a command.

The control unit 117 executes an operation relating to text data determined to be employed. For example, the control unit 117 controls the execution of the application based on a command indicated by the first text data. An example of the execution control by the control unit 117 will be described below.

The communication unit 120 transmits and receives various kinds of data with another instrument. The communication unit 120 transmits the acoustic feature quantities input from the feature quantity calculation unit 114 to the second speech processing device 20. The communication unit 120 outputs the second text data received from the second speech processing device 20 to the control unit 117. The communication unit 120 is a wireless communication interface based on a predetermined communication standard, for example, long term evolution-advanced (LTE-A).

(Second Speech Processing Device)

Next, the configuration of the second speech processing device 20 will be described.

The second speech processing device 20 includes a second speech recognition DB 215, a second speech recognition unit 216, a data extraction unit 218, and a communication unit 220.

The second speech recognition DB 215 stores the second speech recognition data in advance. Similarly to the first speech recognition data, the second speech recognition data includes an acoustic model, a language model, and a word dictionary. However, the second speech recognition data is data with higher versatility than the first speech recognition data.

High versatility is, for example, a state where one of the following (i) to (iii) or the set of (i) to (iii) is satisfied.

(i) The word dictionary included in the second speech recognition data is more abundant in vocabulary or/and embraces a wider field than the word dictionary included in the first speech recognition data.

(ii) The language model included in the second speech recognition data can cope with recognition of a longer sentence than the language included in the first speech recognition data. That is, the order of the highest order N-gram forming the language model included in the second speech recognition data is higher than the first speech recognition data, or/and the kinds of the same order N gram is abundant. The N-gram is data indicating a probability of N (where N is an integer equal to or greater than 1) words appearing simultaneously.

(iii) While the acoustic model included in the second speech recognition data is an acoustic model which is learned in a representative or average acoustic environment (for example, reverberation time, noise level, or the like), the acoustic model included in the first speech recognition data is adapted for an acoustic environment in a room where the first speech processing device 10 is used.

An acoustic model included in a first speech recognition model may be learned such that likelihood is increased under an operation environment. Accordingly, the first speech processing device 10 may include, for example, a speech determination unit (not shown) which detects a segment of speech uttered by a person from the speech signal of each sound source input from the sound source separation unit 113 (speech section detection, VAD: Voice Activity Detection). When power of each frame of the speech signal is higher than a predetermined threshold value of power and the number of zero crossings is within a predetermined number (for example, 300 to 1000 per second), the speech determination unit detects the frame of the speech signal at this time as a speech segment; otherwise, the speech determination unit determines that the frame of the speech signal at this time is a non-speech segment. The number of zero crossings is the number of times that a signal value spans 0, that is, the number of times that a signal value changes from a negative value to a positive value or from a positive value to a negative value. The first speech processing device 10 may include an acoustic model leaning unit (not shown) which adjusts a mixture weighting factor, an average value, and a covariance matrix as the parameters of the acoustic model such that likelihood is increased based on the first text data indicating the content of utterance as a recognition result in the speech segment. The learning of the acoustic model is not limited as being performed in the first speech processing device 10, and may be performed by another instrument.

The second speech recognition unit 216 performs speech recognition processing on the acoustic feature quantity input from the data extraction unit 218 using the second speech recognition data stored in the second speech recognition DB 215. The speech recognition processing performed by the second speech recognition unit 216 may be the same method as the first speech recognition unit 116. The second speech recognition unit 216 generates the second text data indicating the content of utterance and outputs the generated second text data to the communication unit 220.

The data extraction unit 218 extracts the acoustic feature quantity from reception data input from the communication unit 220 and outputs the extracted acoustic feature quantity to the second speech recognition unit 216.

The communication unit 220 transmits and receives various kinds of data with another instrument, for example, the first speech processing device 10. The communication unit 220 outputs reception data including the acoustic feature quantity received from the first speech processing device 10 to the data extraction unit 218. The communication unit 220 transmits transmission data including the second text data input from the second speech recognition unit 216 to the first speech processing device 10. The communication unit 220 is, for example, a communication interface.

(Sound Source Localization)

Next, the MUSIC method which is one method of sound source localization will be described.

The sound source localization unit 112 includes a storage unit which stores a transfer function of each of sound source directions d distributed at a predetermined interval (for example, 1°) in advance. The sound source localization unit 112 generates a transfer function vector D(d) having transfer functions $A_{[d][m]}(\omega)$ to each of channels m (where m is an integer equal to or greater than 1 and equal to or less than M) as elements for each sound source direction d. $\omega$ indicates an angular frequency.

The sound source localization unit 112 converts an acoustic signal $x_m$ of each channel m to a frequency domain for each frame having a predetermined number of samples to calculate a conversion factor $X_m(\omega)$ and calculates an input correlation matrix $R_{xx}$ shown in Expression (1) from the calculated conversion factor.

$$R_{xx} = E[[X][X]^*] \quad (1)$$

In Expression (1), E[ . . . ] indicates an expected value of . . . [X] is an M-dimensional vector which has conversion factors of each channel as elements. [ . . . ]* indicates a conjugate of a matrix or a vector.

Next, the sound source localization unit 112 calculates an eigenvalue $\delta_i$ and an eigenvector $e_i$ of the input correlation matrix $R_{xx}$. The input correlation matrix $R_{xx}$, the eigenvalue $\delta_i$, and the eigenvector $e_i$ have a relationship shown in Expression (2).

$$R_{XX} e_i = \delta_i e_i \quad (2)$$

In Expression (2), i is an integer equal to or greater than 1 and equal to or less than M. The order of the index i is a descending order of the eigenvalue $\delta_i$.

The sound source localization unit 112 calculates a spatial spectrum $P_{sp}(d)$ shown in Expression (3) based on the transfer function vector D(d) and the calculated eigenvector $e_i$.

$$P_{sp}(d) = \frac{|D^*(d)D(d)|}{\sum_{i=K+1}^{M} |D^*(d)e_i|} \quad (3)$$

In Expression (3), K is the number of detectable sound sources (for example, 1), and is a natural number determined in advance to be less than M.

The sound source localization unit 112 calculates the total sum of the spatial spectrum $P_{sp}(d)$ in a frequency domain with an S/N ratio greater than a threshold value (for example, 20 dB) determined in advance as an extended spatial spectrum $P_{ext}(d)$. The sound source localization unit 112 determines the direction d taking the maximum value of the calculated extended spatial spectrum $P_{ext}(d)$ as the sound source direction.

The sound source localization unit 112 may calculate the sound source direction using other methods instead of the MUSIC method. The sound source localization unit 112 may use, for example, a generalized eigenvalue decomposition (GEVD)-MUSIC method, a generalized singular value decomposition (GSVD)-MUSIC method, a weighted delay and sum beam forming (WDS-BF) method, or the like.

(Sound Source Separation)

Next, the GHDSS method which is one method of sound source separation will be described.

The GHDSS method is a method which adaptively calculates a separation matrix $V(\omega)$ such that separation sharpness $J_{SS}([V(\omega)])$ and geometric constraint $J_{GC}([V(\omega)])$ as two cost functions are reduced. The separation matrix $[V(\omega)]$ is a matrix which is used in order to calculate speech signals (estimated value vector) $[u'(\omega)]=[u_1'(\omega), ju_2'(\omega), \ldots, u_S'(\omega)]^T$ of each sound source of S channels by multiplying the speech signal $[x(\omega)]=[x_1(\omega), x_2(\omega), \ldots, x_M(\omega)]^T$ of the M channels input from the sound source localization unit 112. Here, $[\ldots]^T$ indicates a transpose of a matrix or a vector.

The separation sharpness $J_{SS}([V(\omega)])$ is represented as Expression (4). The geometric constraint $J_{GC}([V(\omega)])$ is represented as Expression (5).

$$J_{SS}([V(\omega)])=\|\varphi([u'(\omega)])[u'(\omega)]^H-\text{diag}[\varphi([u'(\omega)])][u'(\omega)]^H\|^2 \quad (4)$$

$$J_{GC}([V(\omega)])=\|\text{diag}[[V(\omega)][A(\omega)]-[I]]\|^2 \quad (5)$$

In Expressions (4) and (5), $\|\ldots\|^2$ is a Frobenius norm of a matrix . . . . The Frobenius norm is a square sum (scalar value) of element values constituting a matrix. $\varphi([u'(\omega)])$ is a nonlinear function of the speech signals $[u'(\omega)]$, for example, a hyperbolic tangent function. $[\ldots]^H$ indicates a conjugate transpose of a matrix or a vector. diag[ . . . ] indicates the total sum of diagonal components of a matrix . . . . Accordingly, the separation sharpness $J_{SS}([V(\omega)])$ is an index value representing the magnitude of a non-diagonal component between channels of the spectrum of the speech signal (estimated value), that is, the degree of erroneous separation of a certain sound source as a different sound source.

In Expression (5), $[A(\omega)]$ indicates a transfer function matrix which has transfer functions from the sound sources to one of the microphones as elements. [I] indicates a unit matrix. Accordingly, the geometric constraint $J_{GC}([V(\omega)])$ is an index value which represents the degree of error between the spectrum of the speech signal (estimated value) and the spectrum of the speech signal (sound source).

The sound source separation unit 113 calculates sound source-specific speech signals $[u'(\omega)]$ relating to each of S sound sources by multiplying the speech signal $[x(\omega)]$ of the M channels input from the sound source localization unit 112 by the separation matrix $[V(\omega)]$.

$$[u'(\omega)]=[V(\omega)][x(\omega)] \quad (6)$$

(Execution Control)

Next, an example of the execution control by the control unit 117 will be described.

As described above, as the classification of a word included in the first text data or the second text data, there are a command and a message.

FIG. 2 is a diagram showing a classification of a word and an example thereof.

A message includes, for example, music (title, performer name, composer name, and the like), mail (sentence to be transmitted or received, and the like), destination (geographical name, facility name, and the like), or the like. A command is a word which instructs the function or operation of the first speech processing device 10, for example, reset or the like. In general, words which are used as a message are more diversified than words which are used as a command, and words which are used as a command are restricted.

FIG. 3 is a priority table showing text data to be employed for each classification of a word and an example of a priority thereof.

The priority table is data which indicates the priority of each of the first text data and the second text data for each example of a word (or a category thereof) of the classification of each word. Symbol "x" indicates an unemployable state. Symbol "○" indicates an employable state. Symbol "⊚" indicates a preferential employable state. The preferential employable state means a state of being employable with priority over the employable state. That is, when both a word relating to the preferential employable state and a word relating to the employable state are included, the word relating to the preferential employable state is employed. The control unit 117 may include a storage unit which stores a priority table in advance, and either the first text data or the second text data may be determined as text data to be employed with reference to the priority table.

For example, for a word relating to "COMMAND" in the second column, it is indicated that only the first text data is employed and the second text data is not employed. This is because a vocabulary of words as recognition candidates is extremely restricted, and the second text data is not necessarily referred to. On the other hand, for all words belonging to "MESSAGE" in the second to fourth columns, the employment of the second text data is permitted. This is because the words have a higher degree of freedom than the word relating to "COMMAND"; therefore, the employment of the second text data acquired using the second speech recognition data further abundant in vocabulary increases a possibility of acquiring an accurate recognition result.

For a word relating to "MUSIC" in the third column among the words relating to "MESSAGE", it is indicated that the second text data is employed with priority over the first text data. When the second text data cannot be acquired due to a communication situation, the first text data may be employed. This is because such a word may be used in a wide field, and there is a high possibility that the second text data acquired by the second speech processing device 20 is more accurate than the first text data. For a word relating to "MAIL" in the fourth column, it is indicated that only the second text data is employed and the first text data is not employed. This is because such a word is arbitrarily uttered by a user, and a vocabulary may be insufficient with the first speech recognition data used when generating the first text data. For a word relating to "DESTINATION" in the fifth column, it is indicated that the first text data is employed with priority over the second text data. This is because it is considered that, when a destination instructed by the user has little change due to action (business, habit, or the like), the first text data acquired using the first speech recognition data is often enough, and when recognition with the first speech recognition unit 116 is unsuccessful, it is enough to employ the second text data.

The content of the priority table shown in FIG. 3 is for illustration, and the content is not limited thereto. The employment or unemployment or the priority can be arbitrarily set according to a word, a category of a word, or the purpose of use.

FIG. 4 shows an example of a state transition diagram of a control state in the control unit 117 according to this embodiment.

The control state includes a state of "AWAITING COMMAND" and a state of "AWAITING MESSAGE". "AWAIT- ING COMMAND" is an operation state where the control unit 117 awaits the first text data, which is a speech recognition result, as a command. The control unit 117 processes the first text data input during "AWAITING COMMAND" as a command. "AWAITING MESSAGE" is an operation state where the control unit 117 awaits the first text data and the second text data, which are a speech recognition result, as a message. The control unit 117 processes the first text data and the second text data input during "AWAITING MESSAGE" as messages with the priority shown in FIG. 3.

The state transition shown in FIG. 4 includes a path p11 where a state of "AWAITING COMMAND" is repeated, a path 12 where the state of "AWAITING COMMAND" transits to a state of "AWAITING MESSAGE", a path p22 where the state of "AWAITING MESSAGE" is repeated, and a path p21 where the state of "AWAITING MESSAGE" transits to the state of "AWAITING COMMAND".

Next, processing relating to state transition will be described.

Figure 5:
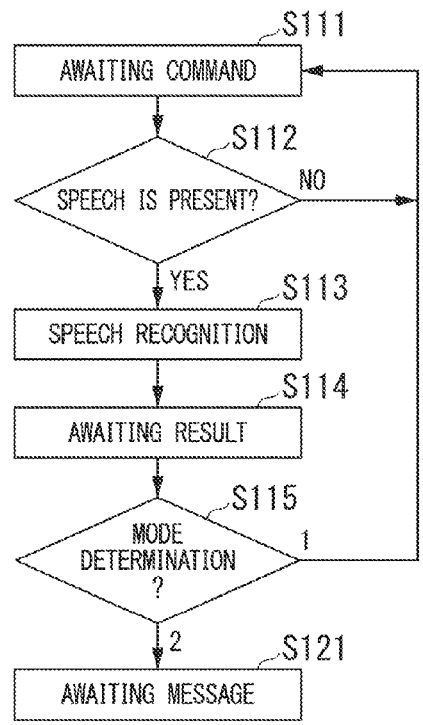
FIG. 5 is a flowchart showing an example of state transition processing according to the first embodiment of the invention.

FIG. 5 is a flowchart showing an example of state transition processing according to this embodiment.

The example shown in FIG. 5 relates to the paths p11 and p12.

(Step S111) The operation state of the control unit 117 is the state of "AWAITING COMMAND". An initial value of the operation state may be the state of "AWAITING COMMAND" or may be the state of "AWAITING MESSAGE". Thereafter, the process progresses to Step S112.

(Step S112) The control unit 117 determines whether or not the speech signal of the M channels is input to the speech signal acquisition unit 110 (speech is present). When it is determined that the speech signal is input (Step S112: YES), the process progresses to Step S113. When it is determined that the speech signal is not input (Step S112: NO), the process returns to Step S111.

(Step S113) In parallel with the speech recognition processing in the first speech recognition unit 116, the second speech recognition unit 216 of the second speech processing device 20 performs speech recognition processing on the acoustic feature quantity received from the first speech processing device 10 to generate the second text data. Thereafter, the process progresses to Step S114.

(Step S114) The control unit 117 awaits the reception of the second text data from the second speech processing device 20 (awaiting result). Thereafter, the process progresses to Step S115.

(Step S115) The control unit 117 performs mode determination based on the received second text data. Here, the control unit 117 determines whether or not a word relating to "MESSAGE" is included in the second text data with reference to the priority table. When it is determined that a word relating to "MESSAGE" is not included (Step S115: 1), the process returns to Step S111. When it is determined that a word relating to "MESSAGE" is included (Step S115: 2), the process progresses to Step S121.

(Step S121) The control unit 117 transits the operation state to "AWAITING MESSAGE".

Thereafter, the processing shown in FIG. 5 ends.

Figure 6:
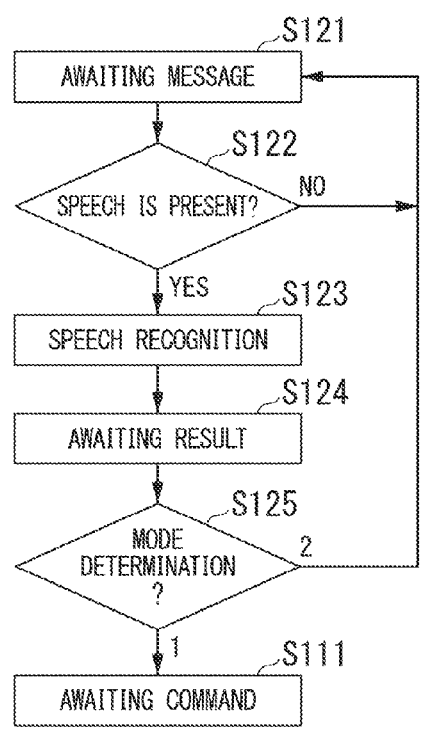
FIG. 6 is a flowchart showing another example of state transition processing according to the first embodiment of the invention.

FIG. 6 is a flowchart showing another example of the state transition processing according to this embodiment.

The example shown in FIG. 6 relates to paths p21 and p22.

(Step S121) The operation state of the control unit 117 is the state of "AWAITING MESSAGE". Thereafter, the process progresses to Step S122.

(Step S122) The control unit 117 determines whether or not the speech signal of the M channels is input to the speech signal acquisition unit 110 (speech is present). When it is determined that the speech signal of the M channels is input (Step S122: YES), the process progresses to Step S123. When it is determined that the speech signal of the M channels is not input (Step S122: NO), the process returns to Step S121.

(Step S123) The first speech recognition unit 116 performs speech recognition processing on the acoustic feature quantity input from the feature quantity calculation unit 114 to generate the first text data. Thereafter, the process progresses to Step S124.

(Step S124) The control unit 117 awaits the input of the first text data from the first speech recognition unit 116 (awaiting result). Thereafter, the process progresses to Step S125.

(Step S125) The control unit 117 performs mode determination based on the input first text data. Here, the control unit 117 determines whether or not a word relating to "COMMAND" is included in the first text data with reference to the priority table. When it is determined that a word relating to "COMMAND" is not included (Step S125: 2), the process returns to Step S121. When it is determined that a word relating to "COMMAND" is included (Step S125: 1), the process progresses to Step S111.

(Step S111) The control unit 117 transits the operation state to "AWAITING COMMAND". Thereafter, the processing shown in FIG. 6 ends.

As described above, the first speech processing device 10 according to this embodiment includes the first speech recognition unit 116 which performs speech recognition on the input speech signal using the first speech recognition data to generate the first text data, and the communication unit 120 which receives the second text data from the second speech recognition unit 216. The first speech processing device 10 includes the control unit 117 which selects either the first text data or the second text data according to the use environment of the device, the second speech recognition unit 216 performs speech recognition on the speech signal received from the first speech processing device 10 using the second speech recognition data with higher versatility than the first speech recognition data to generate the second text data.

According to this configuration, either the first text data acquired by the device or the second text data recognized using the speech recognition data with high versatility and received from another device is selected according to the use environment of the device. For this reason, it is possible to improve recognition accuracy by utilizing the processing resources of another device according to the use environment of the device.

In the first speech processing device 10, the control unit 117 selects either the first text data or the second text data based on words included in the first text data or the second text data.

According to this configuration, text data recognized using more appropriate speech recognition data is selected according to the words forming the content of utterance. For this reason, it is possible to perform appropriate speech recognition according to the purpose of use or the field.

The control unit 117 determines whether or not to select the second text data based on words included in the second text data when the first text data is selected, and determines whether or not to select the first text data based on words included in the first text data when the second text data is selected.

According to this configuration, the selection of either the first text data or the second text data is determined based on text data not selected currently. For this reason, appropriate text data is selected according to changes of the purpose of use or the field, whereby it is possible to improve recognition accuracy.

Second Embodiment

Hereinafter, a second embodiment of the invention will be described referring to the drawings. The same configurations as those in the embodiment described above are represented by the same reference numerals, and description thereof will not be repeated.

Figure 7:
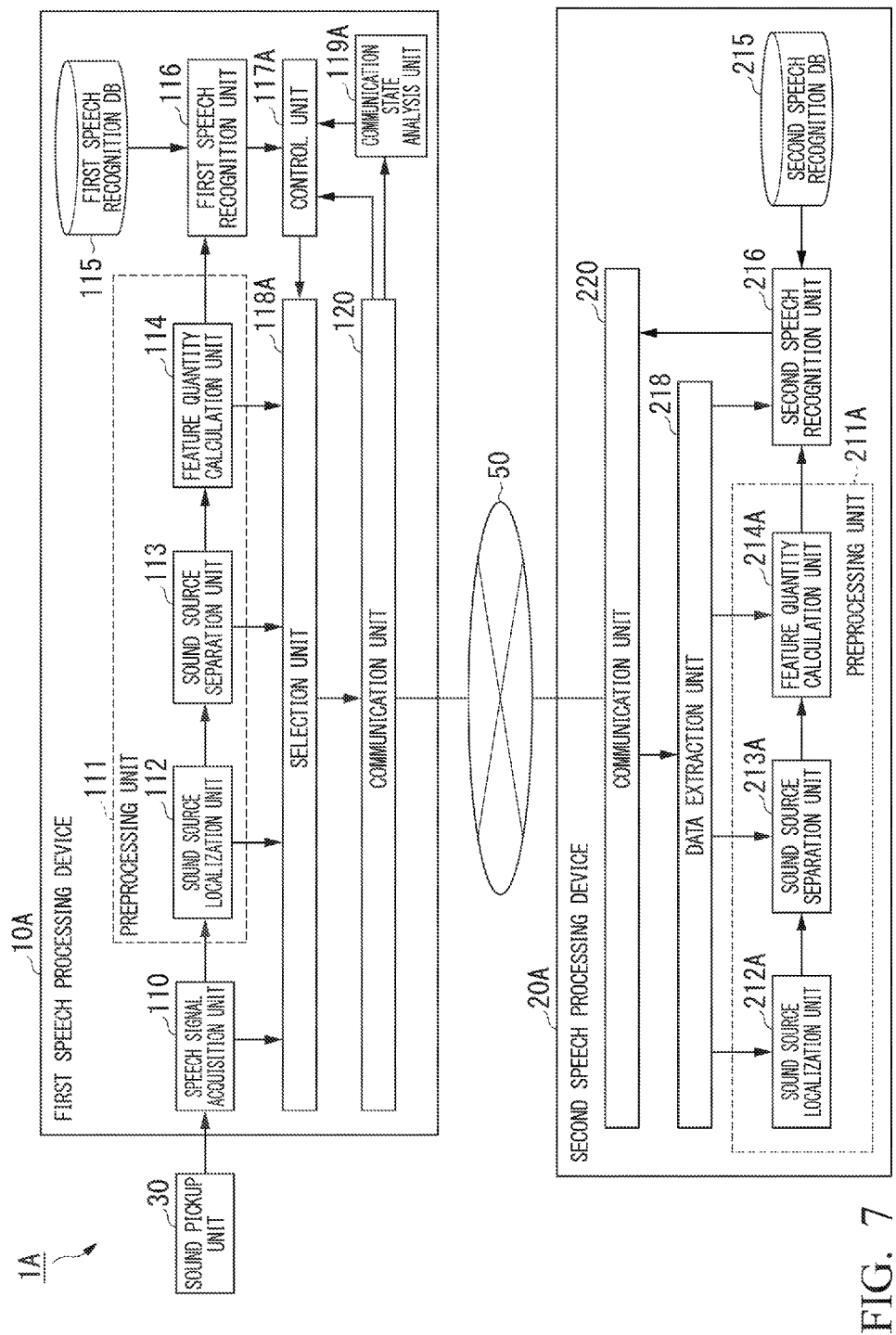
FIG. 7 is a block diagram showing the configuration of a speech processing system according to a second embodiment of the invention.

FIG. 7 is a block diagram showing the configuration of a speech processing system 1A according to this embodiment.

The speech processing system 1A includes a first speech processing device 10A, a second speech processing device 20A, and a sound pickup unit 30.

The first speech processing device 10A includes a speech signal acquisition unit 110, a preprocessing unit 111, a first speech recognition DB 115, a first speech recognition unit 116, a control unit 117A, a selection unit 118A, a communication state analysis unit 119A, and a communication unit 120.

The second speech processing device 20A includes a preprocessing unit 211A, a second speech recognition DB 215, a second speech recognition unit 216, a data extraction unit 218, and a communication unit 220.

The preprocessing unit 211A includes a sound source localization unit 212A, a sound source separation unit 213A, and a feature quantity calculation unit 214A.

(First Speech Processing Device)

Next, the configuration of the first speech processing device 10A will be described focusing on the difference from the first speech processing device 10 (FIG. 1).

The speech signal acquisition unit 110 outputs a speech signal of M channels to the preprocessing unit 111 and the selection unit 118A.

The sound source localization unit 112 performs the speech segment detection described above and outputs sound source direction information indicating a calculated sound source direction and the speech signal of the M channels to the sound source separation unit 113 and the selection unit 118A for a speech segment where utterance is detected.

The sound source separation unit 113 outputs a separated sound source-specific speech signal to the feature quantity calculation unit 114 and the selection unit 118A. Usually, since a speech signal relating to the utterance of one user is input to the first speech processing device 10 at one time, a sound source-specific speech signal of one channel is output.

The feature quantity calculation unit 114 outputs the calculated acoustic feature quantity to the first speech recognition unit 116 and the selection unit 118A.

The control unit 117A selects either the first text data input from the first speech recognition unit 116 or the second text data received from the second speech processing device 20A based on communication state information input from the communication state analysis unit 119A. Here, the control unit 117A determines whether or not to operate the first speech recognition unit 116 based on the communication state information. When stopping the operation of the first speech recognition unit 116, the control unit 117A determines to which hierarchy of processing unit among the sound source localization unit 112, the sound source separation unit 113, and the feature quantity calculation unit 114 as three hierarchies of processing units in the preprocessing unit 111 the operation is allowed. In other words, the control unit 117A stops the operation of a processing unit at the back of a processing unit to which the operation is determined to be allowed. The control unit 117A outputs, to the selection unit 118A, selection information indicating whether or not to stop the operation of the first speech recognition unit 116 and to which hierarchy of processing unit the operation is allowed. In the following description, the uppermost hierarchy among the processing units to be operated is referred to as an "operation hierarchy".

(i) The speech signal of the M channels from the speech signal acquisition unit 110, (ii) the sound source direction information and the speech signal of the M channels from the sound source localization unit 112, (iii) the sound source-specific speech signal from the sound source separation unit 113, and (iv) the acoustic feature quantity from the feature quantity calculation unit 114 may be input to the selection unit 118A.

Based on the selection information input from the control unit 117A, the selection unit 118A determines the necessity of transmission of data, and when transmitting data, selects data (transmission data) to be transmitted from data input to the unit. When the selection information indicates an operation hierarchy, the selection unit 118A selects data input from the processing unit in the operation hierarchy and outputs the selected data to the communication unit 120.

For example, when the selection information indicates that there is no processing unit to be operated, the selection unit 118A outputs (i) the speech signal of the M channels to the communication unit 120. When the selection information indicates the sound source localization unit 112, the selection unit 118A outputs (ii) the sound source direction information and the speech signal of the M channels to the communication unit 120. When the selection information indicates the sound source separation unit 113, (iii) the sound source-specific speech signal is output to the communication unit 120. When the selection information indicates the feature quantity calculation unit 114, (iv) the acoustic feature quantity is output to the communication unit 120. When the selection information indicates that the first speech recognition unit 116 is operated, the selection unit 118A determines that (v) there is no transmission data.

The communication state analysis unit 119A analyzes the communication state with the second speech processing device 20 based on a reception signal input from the communication unit 120. The communication state is, for example, a bandwidth, the degree of shut-down, or the like. The bandwidth described above does not necessarily mean only the width of a frequency band of a carrier wave, and means an effective communication rate or an index of communication quality having a correlation with the effective communication rate.

Shut-down does not necessarily mean only missing of a signal (packet), a state where an electric wave from a base station device is not reached or is weak (out of range). Shut-down also means fluctuation of the reception time of the speech signal when transmission/reception at a given time interval is expected, or transmission quality having a correlation with missing due to fluctuation or transmission error. As the index value of the communication state, for example, one of the field intensity of a carrier wave, a signal-to-interference-plus-noise ratio (SINR), a loss probability, and a total speech transmission quality ratio (R value), or a combination thereof may be used when determining the communication state. The communication state analysis unit 119A outputs communication state information indicating the analyzed communication state to the control unit 117A.

(Second Speech Processing Device)

Next, the configuration of the second speech processing device 20A will be described focusing on the difference from the second speech processing device 20 (FIG. 1).

The second speech processing device 20A includes a preprocessing unit 211A, a second speech recognition DB 215, a second speech recognition unit 216, a data extraction unit 218, and a communication unit 220.

The preprocessing unit 211A includes a sound source localization unit 212A, a sound source separation unit 213A, and a feature quantity calculation unit 214A.

The sound source localization unit 212A calculates the direction of each sound source based on the speech signal of the M channels input from the data extraction unit 218. A method which is used when the sound source localization unit 212A calculates the sound source direction may be the same as the sound source localization unit 112. The sound source localization unit 212A outputs sound source direction information indicating the calculated sound source direction of each sound source and the speech signal of the M channels to the sound source separation unit 213A.

The sound source direction information and the speech signal of the M channels are input to the sound source separation unit 213A from the data extraction unit 218 or the sound source localization unit 212A. The sound source separation unit 213A separates the speech signal of the M channels into sound source-specific speech signals of the sound sources based on the sound source direction indicated by the sound source direction information. A method which is used when the sound source separation unit 213A performs sound source separation may be the same as the sound source separation unit 113. The sound source separation unit 213A outputs the separated sound source-specific speech signal of each of the sound sources to the feature quantity calculation unit 214A.

The feature quantity calculation unit 214A calculates the acoustic feature quantities for the sound source-specific speech signals of the sound sources input from the data extraction unit 218 or the sound source-specific speech signals of the sound sources input from the sound source separation unit 113 at every predetermined time. The acoustic feature quantities calculated by the feature quantity calculation unit 214A may be the same kinds of acoustic feature quantities as the feature quantity calculation unit 114. The acoustic feature quantities calculated by the feature quantity calculation unit 214A may be different from the acoustic feature quantities calculated by the feature quantity calculation unit 114 as long as the acoustic feature quantities are the same kinds and orders of acoustic feature quantities as the acoustic feature quantities relating to the acoustic model forming the second speech recognition data.

The feature quantity calculation unit 214A outputs the calculated acoustic feature quantities to the second speech recognition unit 216.

The second speech recognition unit 216 performs speech recognition processing on the acoustic feature quantities input from the feature quantity calculation unit 214A or the acoustic feature quantities input from the data extraction unit 218 using the second speech recognition data stored in the second speech recognition DB 215.

(Selection Processing)

Next, an example of selection processing which is performed by the control unit 117A will be described.

The control unit 117A includes a storage unit which stores selection data formed by associating the communication state information with the selection information. The control unit 117A reads the selection information corresponding to the communication state information input from the communication state analysis unit 119A with reference to selection data. The control unit 117A determines the necessity of an operation of a processing unit indicated by the read selection information, operates a processing unit whose operation is determined to be required, and stops the operation of a processing unit whose operation is determined to be not required. The selection unit 118A determines transmission data to be transmitted based on the selection information, and transmits the determined transmission data to the second speech processing device 20A through the communication unit 120.

FIG. 8 is data showing an example of a selection table according to this embodiment.

A first column, a second column, and a third column of the selection table respectively indicate transmission data which is instructed based on the communication state information, the selection information (a processing unit to be operated), and the selection information. In the selection table, transmission data is not essential, but is shown for convenience of description.

In the communication state information, band 1 indicates that communication can be performed at a greater bandwidth than a threshold value 1 of a bandwidth determined in advance. The band 1 has, for example, a communication capacity sufficient to transmit and receive the speech signal of the M channels. Band 2 indicates that communication can be performed at a bandwidth which is equal to or less than the threshold value 1 of the bandwidth and is greater than a threshold value 2 of a bandwidth determined in advance. The band 2 has, for example, a communication capacity sufficient to intermittently transmit and receive a speech signal of one channel. Band 3 indicates that communication can be performed at a bandwidth which is equal to or less than the threshold value 2 of the bandwidth and is greater than a threshold value 3 of a bandwidth determined in advance. The band 3 has, for example, a communication capacity sufficient to intermittently transmit and receive an acoustic feature quantity relating to a speech signal of one channel.

In the communication state information, shut-down 1 indicates that the frequency of shut-down is smaller than a threshold value 1 of the frequency of shut-down determined in advance. The shut-down 1 indicates, for example, that various kinds of data can be sufficiently stably transmitted and received. Shut-down 2 indicates that the frequency of shut-down is equal to or greater than the threshold value 1 and is smaller than a threshold value 2 of the frequency of shut-down determined in advance. The shut-down 2 indicates, for example, that shut-down intermittently occurs but shut-down occurs to such an extent that there is no trouble in transmitting information, such as the content of utterance. Shut-down 3 indicates that the frequency of shut-down is equal to or greater than the threshold value 2 or transmission and reception of data cannot be performed.

Accordingly, the example shown in FIG. 8 indicates that the communication state indicated by the communication state information is poor downward from the second row, and the control unit 117A increases the number of processing units to be operated in the first speech processing device 10A and decreases the amount of information of transmission data as the communication state is poor. In other words, it is indicated that the control unit 117A decreases the number of processing units to be operated in the first speech processing device 10A and increases the amount of information of transmission data as the communication state is good, thereby further utilizing the processing resources of the second speech processing device 20A.

In the second row of FIG. 8, the selection information indicating that there is no processing unit to be operated in the preprocessing unit 111 is associated with the communication state information indicating the band 1 and the shut-down 1. In this case, the selection unit 118A transmits (i) the speech signal of the M channels to the second speech processing device 20 through the communication unit 120 as transmission data. Such a communication state corresponds to a case where the bandwidth is sufficiently broad and stable, and may occur, for example, when the first speech processing device 10A and the second speech processing device 20A are connected by a great capacity of line, such as an optical line. With this configuration, the control unit 117A can cause the second speech processing device 20A to execute the sound source localization, the sound source separation, the calculation of the acoustic feature quantity, and the speech recognition processing based on the speech signal of the M channels. Therefore, high-accuracy speech recognition can be realized by utilizing the processing resources, such as abundant data and the amount of processing in the second speech processing device 20A. In addition, the control unit 117A stops the operations of the sound source localization unit 112, the sound source separation unit 113, the feature quantity calculation unit 114, and the first speech recognition unit 116 at the back of the speech signal acquisition unit 110, whereby it is possible to reduce the amount of processing in the first speech processing device 10A.

In the third row of FIG. 8, the selection information indicating that the operation is allowed to the sound source localization unit 112 is associated with the communication state information indicating the band 1 and the shut-down 2. In this case, the selection unit 118A transmits (ii) the sound source direction information and the speech signal of the M channels to the second speech processing device 20 as transmission data. Such a communication state corresponds to a case where the bandwidth is sufficiently broad but shut-down intermittently occurs, and may occur, for example, when the first speech processing device 10A and the second speech processing device 20A are connected in a wireless manner and the first speech processing device 10A is provided in a traveling vehicle and sufficiently approaches the base station device. Here, since the speech signal information is remarkably smaller in the amount of information than the speech signal, the addition of the sound source direction information does not affect communication quality. In addition, since (ii) the sound source direction information and the speech signal of the M channels are generated at the time of intermittent utterance, the amount of information is smaller than (i) the speech signal of the M channels to be generated constantly; therefore, intermittent transmission and reception of data performed when a connection is established is permitted.

With this configuration, the control unit 117A can cause the second speech processing device 20A to execute the sound source separation, the calculation of the acoustic feature quantity, and the speech recognition processing. Therefore, the second speech processing device 20A can skip the sound source localization; however, high-accuracy speech recognition can be realized by utilizing abundant processing resources. In addition, the control unit 117A stops the operations of the sound source separation unit 113, the feature quantity calculation unit 114, and the first speech recognition unit 116 at the back of the sound source localization unit 112, whereby it is possible to reduce the amount of processing in the first speech processing device 10A.

However, the degree of reduction in the amount of processing is small compared to a case where the communication state information indicates the band 1 and the shut-down 1.

In the fourth row of FIG. 8, the selection information indicating that the operation is allowed from the sound source localization unit 112 to the sound source separation unit 113 is associated with the communication state information indicating the band 2 and the shut-down 2. In this case, the selection unit 118A transmits (iii) the sound source-specific speech signals as transmission data. Such a communication state corresponds to a case where the bandwidth is comparatively narrow and shut-down intermittently occurs, and may occur, for example, when the first speech processing device 10A and the second speech processing device 20A are connected in a wireless manner and the first speech processing device 10A is provided in a traveling vehicle and is comparatively away from the base station device. Here, since (iii) the sound source-specific speech signals are generated at the time of intermittent utterance, intermittent transmission and reception of data performed when a connection is established is permitted. In addition, since the sound source-specific speech signals are a speech signal of one channel relating to the utterance of the user, the bandwidth may be narrower than the speech signal of the M channels.

Accordingly, the control unit 117A can cause the second speech processing device 20A to execute the calculation of the acoustic feature quantity and the speech recognition processing. Therefore, the second speech processing device 20A can skip the sound source localization and the sound source separation; however, high-accuracy speech recognition can be realized by utilizing the processing resources. The control unit 117A stops the operations of the feature quantity calculation unit 114 and the first speech recognition unit 116 at the back of the sound source separation unit 113, whereby it is possible to reduce the amount of processing in the first speech processing device 10A. However, the degree of reduction in the amount of processing is small compared to a case where the communication state information indicates the band 1 and the shut-down 2.

In the fifth row of FIG. 8, the selection information indicating that the operation is allowed from the sound source localization unit 112 to the feature quantity calculation unit 114 is associated with the communication state information indicating the band 3 and the shut-down 2. In this case, the selection unit 118A transmits (iv) the acoustic feature quantities as transmission data. Such a communication state corresponds to a case where the bandwidth is further narrower and shut-down intermittently occurs, and may occur, for example, when the first speech processing device 10A and the second speech processing device 20A are connected in a wireless manner and the first speech processing device 10A is provided in a traveling vehicle and is farther away from the base station device, such as a suburb. Here, since (iv) the acoustic feature quantities are generated at the time of intermittent utterance, intermittent transmission and reception of data performed when a connection is established is permitted. In addition, since the acoustic feature quantities are smaller in the amount of information than a speech signal of one channel relating to the utterance of the user, the bandwidth may be narrower than the speech signal of one channel.

With this configuration, the control unit 117A can cause the second speech processing device 20A to execute the speech recognition processing. Therefore, in the second speech processing device 20A, high-accuracy speech recognition based on a vocabulary with high versatility can be realized. In addition, the control unit 117A stops the operation of the first speech recognition unit 116 at the back of the feature quantity calculation unit 114, whereby it is possible to reduce the amount of processing in the first speech processing device 10A. However, the degree of reduction in the amount of processing is small compared to a case where communication state information indicates the band 2 and the shut-down 2.

In the sixth row of FIG. 8, the selection information indicating that the first speech recognition unit 116 is operated is associated with the communication state information indicating the shut-down 3. In this case, the sound source localization unit 112, the sound source separation unit 113, and the feature quantity calculation unit 114 as the three processing units constituting the preprocessing unit 111 are operated.

The selection unit 118A determines that (v) there is no transmission data. Such a communication state corresponds to a case where transmission and reception of data cannot be performed between the first speech processing device 10A and the second speech processing device 20A, and may occur when the first speech processing device 10A is out of range where an electric wave from the base station device is not reached, or when the first speech processing device 10A is in a tunnel or underground where an antenna is not provided. In this case, the control unit 117A cannot acquire the second text data from the second speech processing device 20A, and acquires only the first text data generated by the first speech recognition unit 116 as a speech recognition result.

Since the first speech recognition unit 116 performs the speech recognition processing using the first speech recognition data, a vocabulary or the like may be restricted and recognition accuracy of a long sentence may be degraded; however, speech recognition according to an acoustic environment, that is, speech recognition with high noise resistance and reverberation resistance can be realized. Since transmission and reception of data is not required, the control unit 117A stops the operation of the communication unit 120, and thereby the amount of processing can be reduced.

As described above, in the first speech processing device 10A according to this embodiment, the control unit 117A determines whether or not to operate the first speech recognition unit 116 based on the communication state with the second speech recognition unit 216.

According to this configuration, whether to operate the first speech recognition unit 116 of the device or to receive the second text data acquired using speech recognition data with high versatility with the second speech recognition unit 216 is selected according to the communication state with the second speech recognition unit 216. For this reason, it is possible to improve recognition accuracy by utilizing the processing resources according to the communication state with the second speech recognition unit 216.

The first speech processing device 10A includes the preprocessing unit 111 which performs preprocessing on the speech signal to generate the first acoustic feature quantity. The first speech recognition unit 116 generates the first text data based on the first acoustic feature quantity. The preprocessing unit 111 includes hierarchical processing units of L (for example, 3) hierarchies. An m-th (where m is an integer equal to or greater than 1 and equal to or less than L) hierarchical processing unit performs m-th hierarchical processing on m-th hierarchical data to generate (m+1)th hierarchical data, first hierarchical data is the speech signal, and (L+1)th hierarchical data is the first acoustic feature quantity. The control unit 117A determines to which hierarchy of hierarchical processing unit the operation is allowed according to the communication state.

According to this configuration, the hierarchy of a hierarchical processing unit to be operated among the hierarchical processing units constituting the preprocessing unit 111 is variable according to the communication state. For this reason, it is possible to appropriately control the degree of utilization of processing resources relating to the second speech recognition unit 216 according to the communication state.

In the first speech processing device 10A, L is 3, a first hierarchical processing unit is the sound source localization unit 112 which calculates a sound source direction of each sound source from a speech signal of a plurality of channels, and the second hierarchical processing unit is the sound source separation unit 113 which separates the speech signal of the plurality of channels into sound source-specific speech signals of the sound sources. The third hierarchical processing unit is the feature quantity calculation unit 114 which calculates the acoustic feature quantities from the sound source-specific speech signals.

With this configuration, the hierarchy of a processing unit to be operated among the sound source localization unit 112, the sound source separation unit 113, and the feature quantity calculation unit 114 constituting the preprocessing unit 111 is variable according to the communication state. In addition, the amount of information of generated data becomes smaller in the order of the sound source localization unit 112, the sound source separation unit 113, and the feature quantity calculation unit 114. For this reason, it is possible to control the degree of utilization of processing resources relating to the second speech recognition unit 216 according to the communication state appropriate for the amount of information of data generated in each unit.

Third Embodiment

Next, a third embodiment of the invention will be described. The same configurations as those in the embodiments described above are represented by the same reference numerals, and description will not be repeated.

Although the speech processing systems 1 and 1A according to the embodiments described above are information processing systems in which main information processing is speech recognition, an information processing system 1B according to this embodiment is an information processing system which performs a plurality of kinds of information processing.

Figure 9:
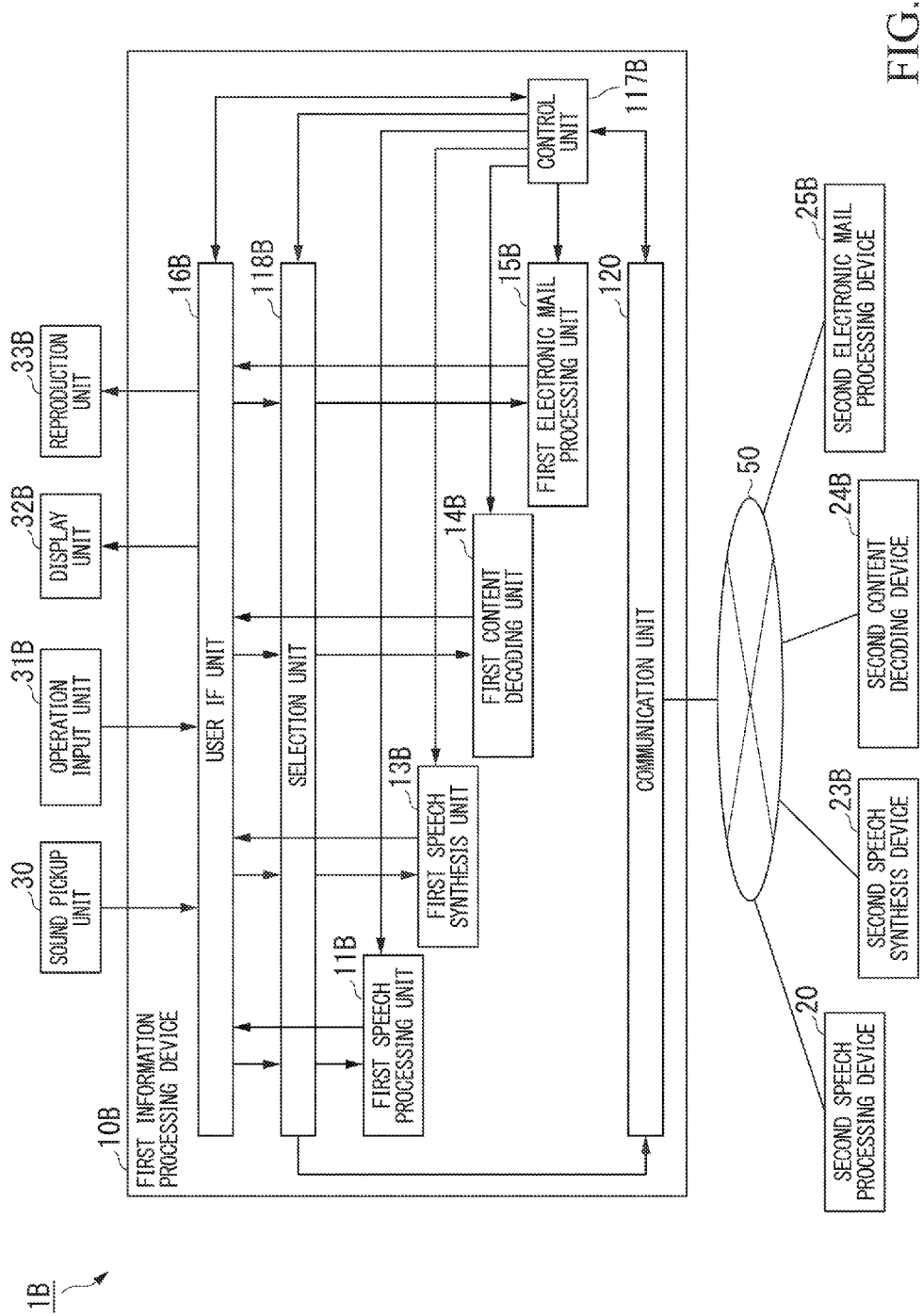
FIG. 9 is a block diagram showing the configuration of an information processing system according to a third embodiment of the invention.

FIG. 9 is a block diagram showing the configuration of the information processing system 1B according to this embodiment.

The information processing system 1B includes a first information processing device 10B, a second speech processing device 20, a second speech synthesis device 23B, a second content decoding device 24B, a second electronic mail processing device 25B, a sound pickup unit 30, an operation input unit 31B, a display unit 32B, and a reproduction unit 33B.

The first information processing device 10B includes a first speech processing unit 11B, a first speech synthesis unit 13B, a first content decoding unit 14B, a first electronic mail processing unit 15B, a user interface (IF) unit 16B, a control unit 117B, a selection unit 118B, and a communication unit 120. The first information processing device 10B may be, for example, a terminal device, such as a mobile phone (including a so-called smartphone), a tablet terminal device, or a personal computer, or may be an in-vehicle acoustic instrument. In the following description, the first speech processing unit 11B, the first speech synthesis unit 13B, the first content decoding unit 14B, and the first electronic mail processing unit 15B may be generally referred to as a first information processing unit. The second speech processing device 20, the second speech synthesis device 23B, the second content decoding device 24B, and the second electronic mail processing device 25B may be generally referred to as a second information processing device. Information processing which is mainly performed by the first information processing unit may be referred to as first information processing, and information processing which is mainly performed by the second information processing device may be referred to as second information processing.

The first speech processing unit 11B performs speech recognition processing on a speech signal input from the sound pickup unit 30 through the user IF unit 16B and the selection unit 118B as a processing target to generate first text data. The first speech processing unit 11B includes the configuration corresponding to the preprocessing unit 111, the first speech recognition DB 115, and the first speech recognition unit 116. The first speech processing unit 11B outputs the generated first text data to the user IF unit 16B. Depending on an application which realizes the function of the user IF unit 16B, the user IF unit 16B outputs the input first text data or second text data input from the second speech processing device 20 through the control unit 117B to the display unit 32B. The display unit 32B displays text representing the content of recognized utterance indicated by the first text data or the second text data.

The first speech synthesis unit 13B performs text speech synthesis processing on target text data indicating text to be processed to generate a first speech signal. In the text speech synthesis processing, the first speech synthesis unit 13B uses, for example, a format synthesis method. The target text data is input from the user IF unit 16B through the selection unit 118B. The first speech synthesis unit 13B outputs the acquired target text data to the selection unit 118B. The content indicated by the generated speech signal includes the same content as the content of text to be processed. The first speech synthesis unit 13B outputs the generated first speech signal to the user IF unit 16B. Depending on an application which realizes the function of the user IF unit 16B, the user IF unit 16B outputs the input first speech signal or a second speech signal input from the second speech synthesis device 23B through the control unit 117B to the display unit 32B. The reproduction unit 33B reproduces speech representing the content of text to be processed as the content of utterance based on the first speech signal or the second speech signal.

The first content decoding unit 14B decodes target content data indicating content to be processed (target content) to generate a first acoustic signal indicating the target content. The target content is, for example, acoustic content, such as a piece of music or uttered speech. The target content is designated by content identification information, such as a caption (for example, title, event name, or the like) and an identification number (for example, content ID (Identifier)), input from the user IF unit 16B through the selection unit 118B. Here, the user IF unit 16B generates content identification information based on the first text data from the first speech processing unit 11B or the operation signal from an operation input unit 31B. The content identification information is represented, for example, in a text format for uniquely specifying the target content, such as a caption or an identification number of the target content, or in other data formats. The first content decoding unit 14B reads target content data identified by the content identification information from content data stored in advance in a storage unit (not shown) by the first information processing device 10B. The storage unit is realized by various storage mediums in the first information processing device 10B. When decoding content data, the first content decoding unit 14B uses a predetermined decoding system corresponding to a coding system used in generating the content data, for example, moving picture experts group advanced audio coding (MPEG-4 AAC). The first content decoding unit 14B outputs the generated first acoustic signal to the user IF unit 16B. Depending on an application which realizes the function of the user IF unit 16B, the user IF unit 16B outputs the input first acoustic signal or a second acoustic signal input from the second content decoding device 24B through the control unit 117B to the reproduction unit 33B. The reproduction unit 33B reproduces speech of the target content based on the first acoustic signal or the second acoustic signal. The target content may include other kinds of information, such as video or text, and the target content may be displayed on the display unit 32B in parallel with the reproduction of speech from the reproduction unit 33B.

The first electronic mail processing unit 15B performs processing relating to transmission or reception of a message based on a command indicated by command data input from the user IF unit 16B through the selection unit 118B (electronic mail). The first electronic mail processing unit 15B acquires message data addressed to the device from a predetermined mail server (not shown) using a predetermined protocol for reception (reception of electronic mail). As the protocol for reception, for example, a protocol, such as a post office protocol (POP) or an internet message access protocol (IMAP), is available. Here, when command data indicating reception is input, the first electronic mail processing unit 15B transmits message request information to the mail server through the communication unit 120. The first electronic mail processing unit 15B receives message data addressed to the device (first information processing device 10B) from the mail server as a response.

The first electronic mail processing unit 15B outputs the received message data to the user IF unit 16B as first electronic mail data. Depending on an application which realizes the function of the user IF unit 16B, the user IF unit 16B outputs the input first electronic mail data or second electronic mail data input from the second electronic mail processing device 25B through the control unit 117B to the display unit 32B. The display unit 32B displays a message indicated by the first electronic mail data or the second electronic mail data.

The first electronic mail processing unit 15B transmits message data to a transmission destination designated with command data through the mail server using a predetermined protocol for transmission (transmission of electronic mail). As the protocol for transmission, for example, a protocol, such as a simple mail transfer protocol (SMPT), can be used. Here, the first electronic mail processing unit 15B generates transmission message data indicating a message to be transmitted based on command data indicating an edit command input from the user IF unit 16B through the selection unit 118B and text data relating to editing. When command data indicating transmission and a transmission destination is input from the user IF unit 16B through the selection unit 118B, the first electronic mail processing unit 15B transmits the generated transmission message data to the mail server through the communication unit 120. The mail server transmits the transmission message data to a mail server which can acquire message data from a device designated by a transmission destination address. As command data and editing text data, for example, data which is generated based on an operation signal from the operation input unit 31B by the execution of an application realizing the function of the user IF unit 16B may be used. In addition, the first text data from the first speech processing unit 11B or the second text data from the second speech processing device 20 may be used in generating command data and editing text data.

The user IF unit 16B selects information processing to be executed based on various signals by a user's instruction. Various signals by the user's instruction are, for example, operation signals input from the operation input unit 31B. For example, when an operation signal indicating the coordinates in a display area of an icon displayed on the display unit 32B is input, the user IF unit 16B selects information processing corresponding to the icon. When the first speech processing unit 11B is operated, the first text data generated based on the speech signal input from the sound pickup unit 30 is available in order to select information processing to be executed. In the example shown in FIG. 9, information processing to be selected is speech recognition, speech synthesis, content decoding, and reception of electronic mail. Speech recognition, speech synthesis, content decoding, and reception of electronic mail are information processing which can be respectively executed in the first speech processing unit 11B, the first speech synthesis unit 13B, the first content decoding unit 14B, and the first electronic mail processing unit 15B. The user IF unit 16B outputs selection information indicating the selected information processing to the control unit 117B. The user IF unit 16B or the control unit 117B may read a predetermined application stored in the storage unit in advance in order to realize the function of the first information processing unit which executes the selected information processing, and may start the read application.

The user IF unit 16B acquires control data for controlling the selected information processing or target data to be processed based on various signals by a user's instruction. Specifically, control data is content identification information which is used in decoding content, or command data which is used in receiving electronic mail. Specifically, target data is a speech signal which is used for speech recognition, text data which is used for speech synthesis, or text data which is used for transmission of electronic mail. The user IF unit 16B outputs the acquired control data and target data to the selection unit 118B. In the following description, control data and target data may be generally referred to as input data, and data obtained by first information processing or second information processing may be generally referred to as processing result data. For example, the speech signal from the sound pickup unit 30 is input data to the first speech processing unit 11B and the second speech processing device 20. The first text data and the second text data are respectively processing result data of the first speech processing unit 11B and the second speech processing device 20.

The user IF unit 16B outputs the processing result data generated by the first information processing or the second information processing to a presentation unit according to a presentation form. The processing result data by the second information processing is received from the second speech processing device through the communication unit 120 and the control unit 117B. For example, the user IF unit 16B outputs the first text data from the first speech processing unit 11B and the second text data from the second speech processing device 20 to the display unit 32B. The user IF unit 16B outputs the first speech signal from the first speech synthesis unit 13B and the second speech signal from the second speech synthesis device 23B to the reproduction unit 33B. The user IF unit 16B outputs the first acoustic signal from the first content decoding unit 14B and the second acoustic signal from the second content decoding device 24B to the reproduction unit 33B. The user IF unit 16B outputs the first electronic mail data from the first electronic mail processing unit 15B and the second electronic mail data from the second electronic mail processing device 25B to the display unit 32B.

The control unit 117B determines whether or not cloud processing is required for information processing indicated by a selection signal input from the user IF unit 16B. In the following description, the cloud processing means processing which is executed by another instrument connected to the network 50 and is the same kind as processing executable by the device. In contrast, processing which is performed by the device is referred to as local processing. In this embodiment, information processing which is performed by the first information processing unit is local processing, and information processing which is performed by the second information processing unit corresponds to cloud processing. The second information processing unit is provided in the second information processing device connected to the network 50, and executes the same kind of information processing as the first information processing unit under a condition with higher versatility. For example, each of speech recognition which is performed by the first speech processing unit 11B, speech synthesis which is performed by the first speech synthesis unit 13B, decoding of content data which is performed by the first content decoding unit 14B, and reception of electronic mail which is performed by the first electronic mail processing unit 15B corresponds to local processing. All of speech recognition which is performed by the second speech processing device 20, speech synthesis which is performed by the second speech synthesis device 23B, decoding of content data which is performed by the second content decoding device 24B, and reception of electronic mail which is performed by the second electronic mail processing device 25B correspond to cloud processing.

The control unit 117B determines that cloud processing is required, for example, when the execution of the cloud processing is instructed by the selection signal, and determines that the cloud processing is not necessarily required when the execution of the cloud processing is not instructed. The control unit 117B may determine that the cloud processing is required when a condition instructed by the selection signal cannot be executed by the first information processing unit and can be executed by the second information processing unit. For example, in regard to content decoding processing, the control unit 117B may determine that the cloud processing is performed when content data indicated by the content identification information can be acquired by the second content decoding device 24B and is not stored in the storage unit of the first information processing device 10B. An example of versatility of a condition for executing the second information processing in the second information processing unit will be described below. Similarly to the control unit 117A, the control unit 117B may determine that the cloud processing is performed when the communication state indicated by the communication state information is superior to a predetermined communication state, and may determine that the cloud processing is not performed when the communication state indicated by the communication state information is inferior to the predetermined communication state.

When it is determined that the cloud processing is not necessarily required, the control unit 117B determines the suitability of the cloud processing for the information processing indicated by the selection signal input from the user IF unit 16B with reference to the suitability data stored in advance in the storage unit. The control unit 117B determines to perform the cloud processing when the determined suitability is equal to or higher than a predetermined threshold value of suitability, and determines to perform the local processing without performing the cloud processing when the determined suitability is less than the predetermined threshold value of suitability. The control unit 117B outputs, to the selection unit 118B, a processing classification signal indicating whether the determined processing is the cloud processing or the local processing. Suitability data will be described below.

When it is determined that the cloud processing is performed, the control unit 117B receives the processing result data received from the second information processing device through the communication unit 120, and outputs the processing result data to the user IF unit 16B. The control unit 117B determines a response state from the second information processing device based on the processing result data. When the response state is inferior to a predetermined response state, the control unit 117B may perform provisional processing. As an index of the response state, for example, the time (TAT: Turn-around Time) from when the selection unit 118B starts the transmission of input data to the second information processing device until the control unit 117B ends the reception of the processing result data to the input data from the second information processing device can be used. For example, when the processing result data is not acquired even if the elapsed time from the start of transmission of the input data is greater than a predetermined time (for example, five seconds), the control unit 117B performs provisional processing. The provisional processing is temporary processing which is performed until the reception of the processing result data by the second information processing is completed. As the provisional processing, one or both of a speech signal and an image signal are output to the reproduction unit 33B and the display unit 32B through the user IF unit 16B as information recognizable by the user. In the provisional processing, for example, utterance (filler), such as "well", "let me see", or "please wait for a while", for filling a gap of interaction, a speech signal indicating waiting sound, and a video signal which indicates an image indicating processing in progress can be used. The control unit 117B may cause the first speech synthesis unit 13B to perform speech synthesis on predetermined text data as provisional processing, and may cause the first content decoding unit 14B to decode predetermined content data. It is possible to eliminate or relax a feeling of boredom by the provisional processing when the user is waiting. The control unit 117B stops the provisional processing when the reception of the processing result data from the second information processing device ends.

The selection unit 118B selects either the first information processing unit or the second information processing device as an output destination of input data input from the user IF unit 16B based on the processing classification signal input from the control unit 117B. The selection unit 118B outputs the input input data to the first information processing unit for information processing when the processing classification signal indicates the local processing, and transmits the input data to the second information processing device through the communication unit 120 for information processing when the processing classification signal indicates the cloud processing. With this, either the first information processing unit or the second information processing unit to be executed is selected.

The operation input unit 31B acquires an operation signal according to an operation input from the user and outputs the acquired operation signal to the user IF unit 16B. The operation input unit 31B includes, for example, a mouse, a touch sensor, and the like. The operation input unit 31B may include a remote controller and an input interface receiving an operation signal from an external instrument, such as a mobile phone.

The display unit 32B displays an image based on an image signal input from the user IF unit 16B. The display unit 32B is, for example, a liquid crystal display (LCD), an organic electroluminescence (EL) display, or the like.

The reproduction unit 33B reproduces speech based on a speech signal or an acoustic signal input from the user IF unit 16B. The reproduction unit 33B is, for example, a speaker or the like.

Next, each device connected to the network 50 will be described.

The second speech synthesis device 23B includes a second speech synthesis unit (not shown) which performs text speech synthesis processing on target text data received from the first information processing device 10B using a predetermined speech synthesis system to generate a second speech signal. The second speech synthesis unit can generate the second speech signal indicating uttered speech adapted to, for example, one or both of more languages and talker characteristics under a condition that versatility is higher than the first speech synthesis unit 13B. The second speech synthesis unit transmits the generated second speech signal to the first information processing device 10B.

The second content decoding device 24B includes a second content decoding unit (not shown) which decodes the target content data identified by the content identification information. The second content decoding device 24B includes a storage unit (not shown) which stores various kinds of content data in advance. The second content decoding unit can use, for example, more diversified content data under a condition that versatility is higher than the first content decoding unit 14B. The second content decoding unit reads, from the storage unit, the target content data identified by the content identification information received from the first information processing device 10B. The second content decoding unit decodes the read target content data using a predetermined decoding system corresponding to a coding system used for coding to generate the second acoustic signal indicating the target content. The second content decoding unit transmits the generated second acoustic signal to the first information processing device 10B.

The second electronic mail processing device 25B includes a second electronic mail processing unit (not shown) which performs processing relating to transmission or reception of a message based on a command indicated by command data received from the first information processing device 10B. The second electronic mail processing unit acquires message data addressed to the first information processing device 10B mainly from a predetermined mail server (not shown) using a predetermined protocol for reception (reception of electronic mail). Examples of a condition that versatility is higher than the first electronic mail processing unit 15B include that the second electronic mail processing unit can receive a message data received previously or message data addressed to an individual electronic device used by the user of the first information processing device 10B. When command data indicating reception is input, the second electronic mail processing unit transmits message request information to the mail server and receives message data addressed to the first information processing device 10B from the mail server as a response. The second electronic mail processing unit transmits the received message data to the first information processing device 10B as second message data.

The second electronic mail processing unit transmits message data to a transmission destination designated with the command data received from the first information processing device 10B through the mail server using a predetermined protocol for transmission (transmission of electronic mail). The second electronic mail processing unit generates transmission message data indicating a message to be transmitted based on command data indicating an edit command received from the first information processing device 10B and text data relating to editing. When command data indicating transmission and a transmission destination is received from the first information processing device 10B, the second electronic mail processing unit transmits the generated transmission message data to the mail server. The mail server transmits the transmission message data to another mail server which can acquire message data from a device designated by a transmission destination address.

The second electronic mail processing device 25B may be constituted as a single server device integrated with the mail server. In this case, transmission and reception of various kinds of data with the mail server can be skipped.

The second speech synthesis device 23B, the second content decoding device 24B, and the second electronic mail processing device 25B may be dedicated devices, or may be constituted by executing processing instructed with a predetermined program in a general-purpose server device.

(Suitability Data)

Next, an example of suitability data which is used in determining suitability of cloud processing in the control unit 117B will be described.

FIG. 10 is a table showing an example of suitability data according to this embodiment.

In the example shown in FIG. 10, the degree of suitability of one of "high", "middle", and "low" is assigned to each kind of processing. The degrees of suitability of three stages of "low", "high", "middle", and "high" are each assigned to speech recognition, speech synthesis, electronic mail reception, and content decoding. When the degree of predetermined suitability is "middle", the control unit 117B determines to perform local processing, cloud processing, cloud processing, and cloud processing for speech recognition, speech synthesis, electronic mail reception, and content decoding.

The degree of suitability of cloud processing shown in FIG. 10 is higher as the amount of information of the input data transmitted from the first information processing device 10B is smaller than the amount of information of the processing result data received by the first information processing device 10B. That is, if the transmission capacity of the processing result data is within a range of transmission capacity transmittable in a downlink band, the degree of suitability of cloud processing is higher as the ratio of the amount of information of the processing result data to the amount of information of the input data is smaller. FIG. 11 shows an example of a bandwidth of an uplink band required for transmitting the input data for respective processing for assigning suitability of cloud processing shown in FIG. 10 and a bandwidth of a downlink band required for receiving the processing result data. An example of suitability of cloud processing is derived from the fact that the downlink band generally has transmission capacity greater than the uplink band in an access line constituting the network 50 connected to the first information processing device 10B. For example, when the communication unit 120 uses LTE as a communication system and sufficient field intensity of an electric wave from the base station device constituting the network 50 is obtained, the average transmission capacity of the uplink band and the downlink band are respectively 9 Mbps and 27 Mbps. In the example shown in FIG. 11, an index of one of three stages of "wide", "middle", and "narrow" is assigned as a bandwidth. In regard to speech recognition, since the bandwidth of the uplink band for transmitting a speech signal and the bandwidth of the downlink band for receiving text data are respectively "wide" and "narrow", "low" is assigned as suitability of cloud processing. In regard to speech synthesis, since the bandwidth of the uplink band for transmitting text data and the bandwidth of the downlink band for receiving a speech signal are respectively "narrow" and "wide", "high" is assigned as suitability of cloud processing. In regard to electronic mail reception, since the bandwidth of the uplink band for transmitting command data and the bandwidth of the downlink band for receiving message data are respectively "narrow" and "middle", "middle" is assigned as suitability of cloud processing. In regard to content data, since the bandwidth of the uplink band for transmitting content identification information and the bandwidth of the downlink band for receiving an acoustic signal are respectively "narrow" and "wide", "high" is assigned as suitability of cloud processing.

(Information Processing)

Next, information processing according to this embodiment will be described.

Figure 12:
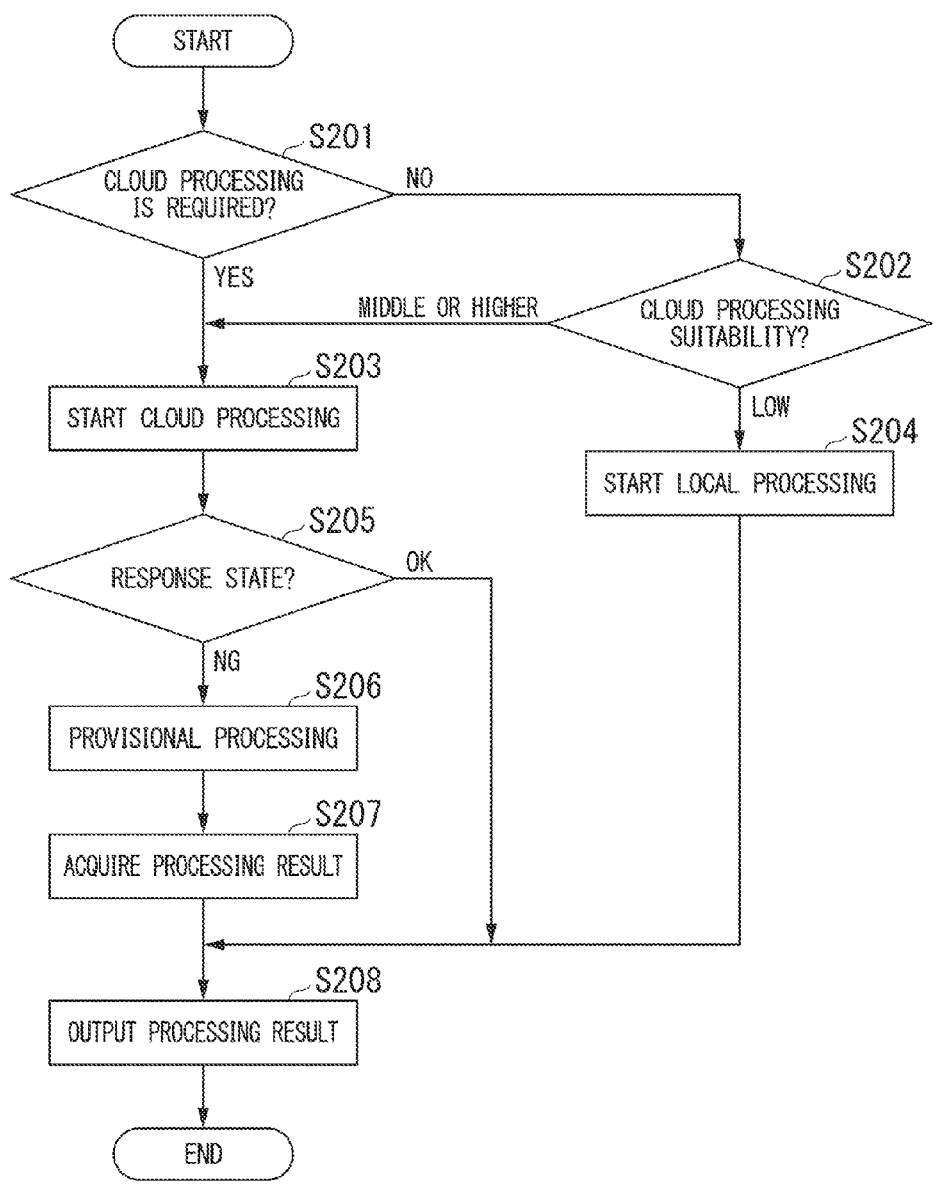
FIG. 12 is a flowchart showing a control example of information processing according to the third embodiment of the invention.

FIG. 12 is a flowchart showing a control example of information processing according to this embodiment.

(Step S201) The control unit 117B determines the necessity of cloud processing for information processing indicated by the selection signal input from the user IF unit 16B. When it is determined that cloud processing is required (Step S201: YES), the process progresses to Step S203. When it is determined that cloud processing is not necessarily required (Step S201: NO), the process progresses to Step S202.

(Step S202) The control unit 117B determines suitability of cloud processing for the information processing instructed for execution with reference to the suitability data. When the determined suitability of cloud processing is equal to or greater than a predetermined threshold value (for example, "middle") of suitability (Step S202: MIDDLE OR HIGHER), the process progresses to Step S203. When the degree of the determined suitability of cloud processing is less than the predetermined threshold value of suitability (Step S202: LOW), the process progresses to Step S204.

(Step S203) The control unit 117B determines to perform cloud processing.

Here, the control unit 117B causes the selection unit 118B to transmit the input data input from the user IF unit 16B to the second information processing device. With this, the second information processing device starts the second information processing (cloud processing) based on the input data received from the first information processing device 10B. Thereafter, the process progresses to Step S205.

(Step S204) The control unit 117B determines to perform local processing. Here, the control unit 117B causes the selection unit 118B to output the input data input from the user IF unit 16B to the first information processing unit. With this, the first information processing unit starts the first information processing (local processing) based on the input data input from the selection unit 118B. Thereafter, the process progresses to Step S208.

(Step S205) The control unit 117B determines the elapsed time from the time of the start of transmission of the input data as a response state from the second information processing device. When the processing result data is not acquired from the second information processing device even if the elapsed time exceeds a predetermined threshold value of the elapsed time (Step S205: NG), the control unit 117 determines that the response state is inferior, and progresses to Step S206. When the processing result data is acquired within the time equal to or less than the predetermined threshold value of the elapsed time (Step S205: OK), the control unit 117 determines that the response state is superior, and progresses to Step S208 without performing the provisional processing.

(Step S206) The control unit 117B starts the provisional processing. Thereafter, the process progresses to Step S207.

(Step S207) In Step S203, when cloud processing is started, the control unit 117B acquires the processing result data from the second information processing device and stops the provisional processing. Thereafter, the process progresses to Step S208.

(Step S208) The control unit 117B or the first information processing unit outputs the acquired processing result data to the display unit 32B or the reproduction unit 33B as a presentation unit according to a presentation form through the user IF unit 16B. Thereafter, the processing shown in FIG. 12 ends.

In Step S202, the threshold value of the degree of suitability which is used when the control unit 117B determines whether or not to perform cloud processing may be variable according to the communication state with the second information processing device. For example, the threshold value of the degree of suitability may be lower as the communication state is superior and may be higher as the communication state is inferior.

As described above, in the first information processing device 10B according to this embodiment, based on the amount of information of the input data used for respective information processing and the amount of information of the processing result data generated by the information processing, the control unit 117B determines whether or not to cause the second information processing unit (for example, the second speech recognition unit 216) in the second information processing device (for example, the second speech processing device 20) to perform the information processing.

With this configuration, the usability of the second information processing unit is determined according to the fact that the degree of effective use of the second information processing unit in the second information processing device connected to the network may be different depending on the classification of information processing. For this reason, it is possible to accurately determine whether or not to use the second information processing unit for each classification of information processing.

In the first information processing device 10B according to this embodiment, the control unit 117B causes the first speech processing unit 11B to perform speech recognition as information processing and causes the speech synthesis unit of the second speech synthesis device 23B, the content decoding unit of the second content decoding device 24B, and the second electronic mail processing unit of the second electronic mail processing device 25B to respectively perform speech synthesis, content decoding, and electronic mail reception as information processing.

With this configuration, speech synthesis, content decoding, or electronic mail reception is executed in the speech synthesis unit of the second speech synthesis device 23B, the content decoding unit of the second content decoding device 24B, or the second electronic mail processing unit of the second electronic mail processing device 25B which can effectively use at the time of information processing. In addition, speech recognition which cannot effectively use the second speech processing unit of the second speech processing device 20 is executed in the first speech processing unit 11B. For this reason, versatility is improved as the whole of the information processing system 1B.

Fourth Embodiment

Next, a fourth embodiment of the invention will be described. The same configurations as those in the embodiments described above are represented by the same reference numerals, and description thereof will not be repeated.

Figure 13:
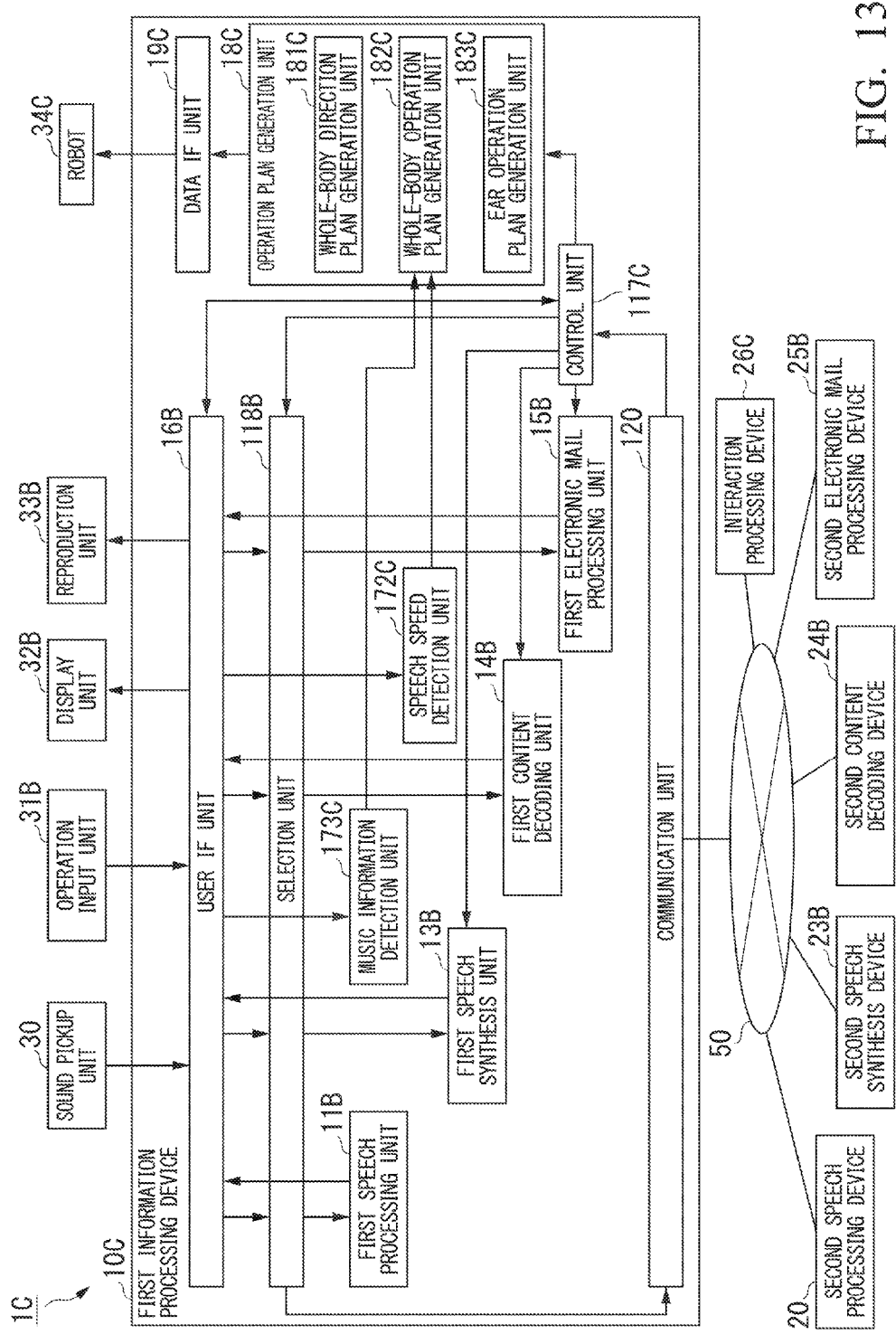
FIG. 13 is a block diagram showing the configuration of an information processing system according to a fourth embodiment of the invention.

FIG. 13 is a block diagram showing the configuration of an information processing system 1C according to this embodiment.

The information processing system 1C includes a first information processing device 10C, a second speech processing device 20, a second speech synthesis device 23B, a second content decoding device 24B, a second electronic mail processing device 25B, an interaction processing device 26C, a sound pickup unit 30, an operation input unit 31B, a display unit 32B, a reproduction unit 33B, and a robot 34C. The sound pickup unit 30 is provided in the head portion of the robot 34C, and the reproduction unit 33B is provided in front of the robot 34C.

The robot 34C is operated based on operation plan data input from the first information processing device 10C. The robot 34C is, for example, a humanoid robot or a character robot (robot agent) which includes a head portion, two auricle portions, a body portion, two upper arm portions, and two lower limb portions, and an operation mechanism for operating the portions. The operation mechanism includes a motor which operates the portions when electric power is supplied as a power source. The two auricle portions are provided on the right and left sides with respect to the front of the head portion. The auricle portions provided on the right and left sides are respectively referred to as a right auricle portion and a left auricle portion.

The first information processing device 10C includes a first speech processing unit 11B, a first speech synthesis unit 13B, a first content decoding unit 14B, a first electronic mail processing unit 15B, a user IF unit 16B, an operation plan generation unit 18C, a data IF unit 19C, a control unit 117C, a selection unit 118B, a communication unit 120, a speech speed detection unit 172C, and a music information detection unit 173C. The operation plan generation unit 18C includes a whole-body direction plan generation unit 181C, a whole-body operation plan generation unit 182C, and an ear operation plan generation unit 183C.

In addition to performing the same processing as the control unit 117B, when information processing indicated by the selection signal input from the user IF unit 16B is interaction processing, the control unit 117C of the first information processing device 10C transmits the input data input from the user IF unit 16B to the interaction processing device 26C through the communication unit 120. As the input data for interaction processing, the first text data which is the processing result data from the first speech processing unit 11B or the second text data which is the processing result data from the second speech processing device 20 is used.

The interaction processing device 26C receives the first text data or the second text data from the first information processing device 10C through the network 50. The interaction processing device 26C acquires response data corresponding to the acquired first text data or second text data. The interaction processing device 26C includes a storage unit (not shown) which stores predetermined keyword information and presentation information in advance. As the keyword information, for example, positional information indicating a geographical name, personal information indicating a person's name, and classification information indicating the classification of information to be required are stored. The classification of information includes weather information, traffic information, and the like. As the presentation information, response information corresponding to the keyword information and the classification information, sentence pattern information (template) for forming a response sentence of each classification of information by substituting the response information, and the like are stored. As the response information, for example, weather information and traffic information of each area are stored. The interaction processing device 26C extracts the keyword information and the classification information from the acquired first text data or second text data. The interaction processing device 26C reads the response information corresponding to the extracted keyword information and classification information and the sentence pattern information corresponding to the classification information from the storage unit. The interaction processing device 26C generates response data indicating a response sentence by substituting the read response information in the sentence pattern information. The interaction processing device 26C transmits the generated response data to the first information processing device 10C through the network 50. The interaction processing device 26C is, for example, a Web server, such as a retrieval server. In this case, the user IF unit 16B may execute processing instructed by a predetermined browser as an application, thereby realizing the function.

The response data received by the first information processing device 10C is input to the whole-body operation plan generation unit 182C through the communication unit 120 and the control unit 117C. The response data is output to the first speech synthesis unit 13B or the second speech synthesis device 23B through the user IF unit 16B and the selection unit 118B as target text data. For this reason, synthesized speech representing a response corresponding to utterance recognized by speech recognition from speech recorded by the utterance of the user is reproduced from the reproduction unit 33B.

In this embodiment, sound sources of sound source-specific speech signals used in generating the first text data or the second text data transmitted to the interaction processing device 26C and sound source identification information indicating either the first text data or the second text data based on the sound source-specific speech signals which indicate the sound sources indicating the sound source direction are added. That is, the sound source identification information is information indicating an utterer and the direction of the utterer. As described above, the sound source-specific speech signal is generated in the sound source separation unit 113 of the first speech processing unit 11B, and the sound source direction is calculated in the sound source localization unit 112 of the first speech processing unit 11B.

Accordingly, the control unit 117C detects the sound source identification information added to the first text data or the second text data and outputs the detected sound source identification information to the whole-body direction plan generation unit 181C.

The control unit 117C acquires sound source direction information indicating the sound source direction of each sound source generated in the sound source localization unit 112 through the user IF unit 16B and outputs the acquired sound source direction information to the ear operation plan generation unit 183C.

The speech speed detection unit 172C acquires, from the user IF unit 16B, the first speech signal which is the processing result data from the first speech synthesis unit 13B or the second speech signal which is the processing result data from the second speech synthesis device 23B. The speech speed detection unit 172C detects a speech speed of speech indicated by the acquired first speech signal or second speech signal using a predetermined speech speed detection method. The speech speed detection unit 172C generates speech speed information indicating the detected speech speed and outputs the generated speech speed information to the whole-body operation plan generation unit 182C.

The music information detection unit 173C detects music information relating to music represented by a speech signal input from the sound pickup unit 30 through the user IF unit 16B. The music information detection unit 173C detects, as music information, the beat, scale, and strength constituting music using a method described in, for example, Japanese Unexamined Patent Application, First Publication No. 2011-180590. The music information detection unit 173C outputs the detected music information to the whole-body operation plan generation unit 182C.

The operation plan generation unit 18C generates operation plan data indicating operation plan values for controlling the operation of the robot 34C. The operation plan values are values which indicate power supplied to the operation mechanism for operating the robot 34C in a predetermined operation form. The operation plan generation unit 18C generates, as the operation plan data, whole-body direction plan data, whole-body operation plan data, and ear operation plan data described below.

The whole-body direction plan generation unit 181C generates whole-body direction plan data indicating operation plan values for controlling the direction of the whole body of the robot 34C based on the sound source identification information input from the control unit 117C. The whole-body direction plan generation unit 181C generates whole-body direction plan data for operating the lower limb portions, for example, such that the front surface of the whole body of the robot 34C is directed toward the sound source direction indicated by the sound source identification information. The whole-body direction plan generation unit 181C transmits the generated whole-body direction plan data to the robot 34C through the data IF unit 19C. The robot 34C supplies the supply power instructed by the operation plan values indicated by the whole-body direction plan data received from the whole-body direction plan generation unit 181C to the operation mechanism of leg portions. Accordingly, the lower limb portions of the robot 34C are operated to direct the front surface of the robot 34C toward the direction of a talker which is a sound source.

When response data is input from the interaction processing device 26C through the control unit 117C, the whole-body operation plan generation unit 182C generates whole-body operation plan data corresponding to text data indicated by the response data. The storage unit of the first information processing device 10C stores, for example, whole-body operation mode data indicating a time-series pattern of operation plan values for applying the operation modes of the body portion, the head portion, and the upper arm portions as a principal portion of the configuration of the robot 34C for each predetermined phoneme string in advance. The whole-body operation plan generation unit 182C generates a phoneme string indicated by input target text data and reads whole-body operation mode data corresponding to the phoneme string included in the generated phoneme string from the storage unit. The whole-body operation plan generation unit 182C adjusts a speech speed relating to the time-series pattern of the operation plan values indicated by the read whole-body operation mode data to a speech speed indicated by the speech speed information input from the speech speed detection unit 172C. The whole-body operation plan generation unit 182C generates whole-body operation plan data indicating the time-series pattern of the operation plan values with the adjusted speech speed and transmits the generated whole-body operation plan data to the robot 34C through the data IF unit 19C. The robot 34C supplies the supply power instructed by the operation plan values indicated by the whole-body operation plan data received from the whole-body operation plan generation unit 182C to the operation mechanism of the principal portion described above. Accordingly, the robot 34C is synchronized with the utterance of synthesized speech and operates in a mode according to the utterance.

When the music information is input from the music information detection unit 173C, the whole-body operation plan generation unit 182C generates whole-body operation plan data corresponding to the music information. The storage unit of the first information processing device 10C further stores, for example, whole-body operation mode data indicating a time-series pattern of operation plan values for applying the operation mode of the principal portion of the robot 34C for each predetermined time series of scale and strength. The whole-body operation plan generation unit 182C reads whole-body operation mode data corresponding to a time series of scale and strength corresponding to the time series of scale and strength indicated by the music information input for each predetermined time from the storage unit. The whole-body operation plan generation unit 182C adjusts a beat interval relating to the time series pattern of the operation plan values indicated by the read whole-body operation mode data to a beat interval applied in the time series of beats indicated by the speech speed information input from the speech speed detection unit 172C. The whole-body operation plan generation unit 182C generates whole-body operation plan data indicating the time-series pattern of the operation plan values with the adjusted beat interval and transmits the generated whole-body operation plan data to the robot 34C through the data IF unit 19C. The robot 34C supplies the supply power instructed by the operation plan values indicated by the whole-body operation plan data received from the whole-body operation plan generation unit 182C to the operation mechanism of the principal portion described above. Accordingly, the robot 34C is synchronized with the beat of recorded music and operates in a mode according to the melody or strength.

The ear operation plan generation unit 183C generates ear operation plan data indicating operation plan values for controlling the direction of the auricle portions of the robot 34C based on the sound source direction information input from the control unit 117C. For example, when the sound source direction indicated by the sound source identification information is the left side with respect to the front surface of the robot 34C, the ear operation plan generation unit 183C generates ear operation plan data for displacing the positions of the left auricle portion in a predetermined cycle. For example, when the sound source direction indicated by the sound source identification information is the right side with respect to the front surface of the robot 34C, the ear operation plan generation unit 183C generates ear operation plan data for displacing the position of the right auricle portion in a predetermined cycle. The ear operation plan generation unit 183C transmits the ear operation plan data to the robot 34C through the data IF unit 19C. The robot 34C supplies the supply power instructed by the operation plan values indicated by the ear operation plan data received from the ear operation plan generation unit 183C to the operation mechanism of the left auricle portion or the right auricle portion. Accordingly, when the sound source direction is the left side with respect to the front surface of the robot 34C, the left auricle portion operates in a predetermined cycle. When the sound source direction is the right side with respect to the front surface of the robot 34C, the right auricle portion operates in a predetermined cycle. Since an auricle portion in a direction more approximating the direction of the talker as a sound source is operated, the utterer is given a psychological feeling that his/her utterance is listened.

The data IF unit 19C outputs various kinds of operation plan data input from the operation plan generation unit 18C to the robot 34C. The data IF unit 19C is, for example, a data input/output interface.

As described above, according to this embodiment, the first information processing device 10C according to this embodiment includes the operation plan generation unit 18C which generates the operation plan data indicating the operation plan values for controlling the operation of the robot 34C. The front surface of the whole body of the robot 34C can be directed toward the sound source, for example, the talker by the whole-body direction plan data generated based on the sound source identification information. An auricle portion provided on a side approximating the direction of the sound source, for example, the talker with respect to the front surface of the robot 34C can be operated by the ear operation plan data generated based on the sound source direction information. The principal portion of the robot 34C can be operated in time to music by the whole-body operation plan data generated based on the music information. Furthermore, the principal portion of the robot 34C can be operated in time to a response to the utterance of the utterer by the whole-body operation plan data generated based on the response data and the speech speed information.

For this reason, the user comes into contact with the operation of the robot 34C according to his/her utterance, thereby getting interest and maintaining an incentive for utterance to the first information processing device 10C.

Although the embodiments of the invention have been described referring to the drawings, a specific configuration is not limited thereto, and various design changes and the like can be made without departing from the scope of the invention.

For example, the control unit 117 may execute or may not execute the same processing as the control unit 117A. When the second text data is likely to be selected, the control unit 117A performs processing for determining whether or not to operate the first speech recognition unit 116 based on the communication state information, and processing for determining to which hierarchy of processing unit among the sound source localization unit 112, the sound source separation unit 113, and the feature quantity calculation unit 114 the operation is allowed. When the second text data is likely to be selected, this refers to when the operation state is the state of "AWAITING MESSAGE" (FIG. 4).

Although a case where the preprocessing units 111 and 211A described above respectively include the three hierarchies of processing units of the sound source localization units 112 and 212A, the sound source separation units 113 and 213A, and the feature quantity calculation units 114 and 214A has been described as an example, the invention is not limited thereto. The number of hierarchies of the preprocessing units 111 and 211A may be equal to or less than two, or may be equal to or greater than four. When the number of hierarchies of the preprocessing units 111 and 211A is four, reverberation suppression units (not shown) may be provided between the sound source separation units 113 and 213A and the feature quantity calculation units 114 and 214A. The reverberation suppression units perform reverberation suppression on the input sound source-specific speech signals and output the sound source-specific speech signals with suppressed reverberation components. As a reverberation suppression method, for example, a spectral subtraction method or a Wiener filtering method can be used.

When the number of hierarchies of the preprocessing units 111 and 211A is one, the sound source localization units 112 and 212A and the sound source separation units 113 and 213A may not be provided.

The second speech recognition DB 215 may store J (where J is an integer equal to or greater than 2 determined in advance) pieces of second speech recognition data in advance. The J pieces of second speech recognition data include word dictionaries of vocabularies for different purposes of use or fields. In this case, when a word for a certain purpose of use or field is included in the first text data or the second text data, the control units 117 and 117A select the speech recognition data corresponding to the word from the J pieces of second speech recognition data. The control units 117 and 117A transmit speech recognition data instruction information indicating the selected speech recognition data to the second speech processing devices 20 and 20A. The second speech recognition unit 216 of the second speech processing devices 20 and 20A performs speech recognition processing using the speech recognition data indicated by the speech recognition data instruction information received from the first speech processing devices 10 and 10A.

With this configuration, in the second speech recognition unit 216, a plurality of pieces of second speech recognition data can be used properly according to the purpose of use or the field relating to the utterance of the user of the first speech processing devices 10 and 10A.

A plurality of second speech processing devices 20 and 20A which respectively include one second speech recognition unit 216 performing speech recognition processing using second speech recognition data including word dictionaries of vocabularies for different purposes of use or fields may be connected to the network 50. In this case, when a word for a certain purpose of use or field is included in the first text data or the second text data, the control units 117 and 117A select the second speech processing devices 20 and 20A which include the second speech recognition DB 215 storing speech recognition data corresponding to the word. The control unit 117 transmits the first acoustic feature quantity to the selected second speech processing device 20. Similarly, the control unit 117A transmits one of (i) the speech signal of the M channels, (ii) the sound source direction information and the speech signal of the M channels, (iii) the sound source-specific speech signals, and (iv) the acoustic feature quantities to the selected second speech processing device 20A. The second speech recognition unit 216 of the second speech processing devices 20 and 20A selected by the control units 117 and 117A performs speech recognition processing on the acoustic feature quantity based on data received from the first speech processing devices 10 and 10A.

With this configuration, the second speech processing devices 20 and 20A which are distributedly arranged in the network and execute speech recognition processing using different pieces of second speech recognition data can be used properly according to the purpose of use or the field relating to the utterance of the user of the first speech processing devices 10 and 10A.

In Steps S112 (FIG. 5) and S122 (FIG. 6) described above, the control units 117 and 117A may perform speech detection processing for the sound source-specific speech signals output from the sound source separation unit 113. The control units 117 and 117A may determine that speech is present when it is determined to be a speech segment in the speech detection processing, and may determine that speech is absent when it is determined to be not a speech segment.

The information processing systems 1B and 1C may include the second speech processing device 20A, instead of the second speech processing device 20. In this case, the first information processing devices 10B and 10C include the communication state analysis unit 119A, and the control units 117B and 117C determine the necessity of the operations of processing units similarly to the control unit 117A, operates processing units whose operation is determined to be required, and stops the operation of processing units whose operation is determined to be not required. The selection unit 118B determines transmission data to be transmitted similarly to the selection unit 118A and transmits the determined transmission data to the second speech processing device 20A through the communication unit 120.

The communication state analysis unit 119A in the first information processing devices 10B and 10C may analyze the communication state with the second speech synthesis device 23B, the second content decoding device 24B, the second electronic mail processing device 25B, and the interaction processing device 26C, in addition to the second speech processing device 20. The control units 117B and 117C may determine the necessity of cloud processing based on the analyzed communication state.

The first information processing device 10C may be integrated with the robot 34C and constituted as a single robot 34C. The robot 34C may be integrated with one or both of the operation input unit 31B and the display unit 32B.

In the embodiments described above, although a case where the second speech processing devices 20 and 20A, the second speech synthesis device 23B, the second content decoding device 24B, the second electronic mail processing device 25B, and the interaction processing device 26C are individually provided has been described as an example, the invention is not limited thereto. All or any combination of the second speech processing devices 20 and 20A, the second speech synthesis device 23B, the second content decoding device 24B, the second electronic mail processing device 25B, and the interaction processing device 26C may be constituted as an integrated single server device. The number of each of the second speech processing devices 20, the second speech synthesis devices 23B, the second content decoding devices 24B, and the second electronic mail processing units or interaction processing devices 26C is not limited to one, and may be two or more.

Part of the first speech processing devices 10 and 10A or the first information processing devices 10B and 10C in the embodiments described above, for example, part of the sound source localization unit 112, the sound source separation unit 113, the feature quantity calculation unit 114, the first speech recognition unit 116, the control units 117, 117A, 117B, and 117C, the selection units 118A and 118B, the communication state analysis unit 119A, the first speech processing unit 11B, the first speech synthesis unit 13B, the first content decoding unit 14B, the first electronic mail processing unit 15B, the user IF unit 16B, the speech speed detection unit 172C, the music information detection unit 173C, the whole-body direction plan generation unit 181C, the whole-body operation plan generation unit 182C, the ear operation plan generation unit 183C, and the second speech processing device 20, for example, the sound source localization unit 212A, the sound source separation unit 213A, the feature quantity calculation unit 214A, the second speech recognition unit 216, and the data extraction unit 218 may be realized by a computer. In this case, a program for realizing the control function of the device may be recorded in a computer-readable recording medium, and the program recorded on the recording medium may be read into a computer system and executed to realize the control function. The "computer system" used herein is assumed to be a computer system embedded in the first speech processing devices 10 and 10A, the first information processing devices 10B and 10C, and the second speech processing devices 20 and 20A and including an OS and hardware, such as peripherals. Furthermore, the "computer-readable recording medium" used herein refers to a portable medium, such as a flexible disk, a magneto-optical disk, a ROM, or a CD-ROM, or a storage device, such as a hard disk embedded in the computer system. In addition, the "computer-readable recording medium" may also include a medium which dynamically holds a program for a short period of time, such as a communication line when the program is transmitted through a network, such as the Internet, or a communication network line, such as a telephone network line, and a medium which holds the program for a given period of time, such as a volatile memory in a computer system which serves as a server or a client. The program described above may be a program which realizes part of the functions described above. The functions described above may be realized in combination with a program having already been recorded in the computer system.

Part or all of the first speech processing devices 10 and 10A in the embodiments and modification examples described above, part or all of the first information processing devices 10B and 10C, or part or all of the second speech processing devices 20 and 20A may be realized as an integrated circuit, such as large scale integration (LSI). Each of the functional blocks of each of the first speech processing devices 10 and 10A, the first information processing devices 10B and 10C, and the second speech processing devices 20 and 20A may be individually realized in the form of a processor, or part or all of the functional blocks may be integrated in the form of a processor. A circuit integration technique is not limited to LSI and may be realized in the form of a dedicated circuit or a general-purpose processor.

When the advance of a semiconductor technology allows advent of a circuit integration technique which replaces LSI, an integrated circuit based on the technology may be used.

Although an embodiment of the invention has been described in detail referring to the drawings, a specific configuration is not limited thereto, and various design changes and the like can be made without departing from the scope of the invention.

The invention claimed is:

1. An information processing device comprising:
a first speech recognizer which performs speech recognition on an input speech signal using first speech recognition data to generate first text data;
a transceiver which is capable of receiving, from a second speech recognizer which performs speech recognition using second speech recognition data with higher versatility than the first speech recognition data to generate second text data, the second text data; and
a controller that determines whether or not to stop an operation of the first speech recognizer based on a communication state with the second speech recognizer; and
a first preprocessor which performs pre-processing on the speech signal to generate a first acoustic feature quantity, wherein
the first preprocessor includes hierarchical processors of L (where L is a prescribed integer equal to or greater than 1) hierarchies,
an m-th (where m is an integer equal to or greater than 1 and equal to or less than L) hierarchical processor performs an m-th hierarchical processing on m-th hierarchical data to generate (m+1)th hierarchical data, first hierarchical data is the speech signal, and (L+1)th hierarchical data is the first acoustic feature quantity, and
the controller determines to which hierarchy of the hierarchical processors is operated in response to the communication state when stopping, an operation of the first speech recognizer, wherein
a first hierarchical processor is a sound source localizer which calculates a sound source direction of each sound source from a speech signal of a plurality of channels,
a second hierarchical processor is a sound source separator which separates the speech signal of the plurality of channels into sound source-specific speech signals of each of the sound sources, and
a third hierarchical processor is a feature quantity calculator which calculates acoustic feature quantities from the sound source-specific speed signals.

2. An information processing system comprising:
a first information processing device; and a second information processing device, wherein
the first information processing device includes:
a first speech recognizer which performs speech recognition on an input speech signal using first speech recognition data to generate first text data;
a transceiver which is capable of receiving second text data from the second information processing device; and
a controller that determines whether or not to stop an operation of the first speech recognizer based on a communication state with the second information processing device, and
a preprocessor which performs pre-processing on the speech signal to generate a first acoustic feature quantity, and wherein the preprocessor includes hierarchical processors of L (where L is a prescribed integer equal to or greater than 1) hierarchies, an m-th (where m is an integer equal to or greater than 1 and equal to or less than L) hierarchical processor performs an m-th hierarchical processing on m-th hierarchical data to generate (m+1)th hierarchical data, first hierarchical data is the speech signal, and (L+1)th hierarchical data is the first acoustic feature quantity, and the controller determines to which hierarchy of the hierarchical processors is operated in response to the communication state when stopping an operation of the first speech recognizer, and wherein the second information processing device includes:

a second speech recognizer which performs speech recognition on the speech signal using second speech recognition data with higher versatility than the first speech recognition data to generate second text data, wherein L is 3, a first hierarchical processor is a sound source localizer which calculates a sound source direction of each sound source from a speech signal of a plurality of channels, a second hierarchical processor is a sound source separator which separates the speech signal of the plurality of channels into sound source-specific speed' signals of each of the sound sources, and a third hierarchical processor is a feature quantity calculator which calculates acoustic feature quantities from the sound source-specific speech signals.

3. An information processing method in an information processing device that comprises a transceiver which is capable of receiving, from a speech recognizer which performs speech recognition using second speech recognition data with higher versatility than first speech recognition data to generate second text data, the second text data, the method comprising:

a speech recognition process of performing speech recognition on an input speech signal using the first speech recognition data to generate first text data;

a control process of determining whether or not to stop the speech recognition process based on a communication state with the speech recognizer; and a preprocessing process of performing pre-processing on the speech signal to generate a first acoustic feature quantity, wherein the preprocessing process includes hierarchical processing processes of L (where L is a prescribed integer equal to or greater than 1) hierarchies, an m-th (where m is an integer equal to or greater than 1 and equal to or less than L) hierarchical processing process performs an m-th hierarchical processing on m-th hierarchical data to generate (m+1)th hierarchical data, first hierarchical data is the speech signal, and (L+1)th hierarchical data is the first acoustic feature quantity, and the control process determines to which hierarchy of the hierarchical processing processes is executed in response to the communication state when stopping the speech recognition process based on the communication state, wherein L is 3, a first hierarchical processor is a sound source localizer which calculates a sound source direction of each sound source from a speech signal of a plurality of channels, a second hierarchical processor is a sound source separator which separates the speech signal of the plurality of channels into sound source-specific speech signals of each of the sound sources, and a third hierarchical processor is a feature quantity calculator which calculates acoustic feature quantities from the sound source-specific speech signals.

4. A non-transitory computer readable, medium storing an information processing program that causes a computer of an information processing device that comprises a transceiver which is capable of receiving, from a speech recognizer which performs speech recognition using second speech recognition data with higher versatility than first speech recognition data to generate second text data, the second text data to execute:

a speech recognition sequence of performing speech recognition on an input speech signal using the first speech recognition data to generate first text data;

a control sequence of determining whether or not to stop the speech recognition sequence based on a communication state with the speech recognizer; and a preprocessing sequence of performing pre-processing on the speech signal to generate a first acoustic feature quantity, wherein the first preprocessing sequence includes hierarchical processing sequences of L (where L is a prescribed integer equal to or greater than 1) hierarchies, an m-th (where m is an integer equal to or greater than 1 and equal to or less than L) hierarchical processing sequence performs an m-th hierarchical processing on m-th hierarchical data to generate (m+1)th hierarchical data, first hierarchical data is the speech signal, and (L+1)th hierarchical data is the first acoustic feature quantity, and the control sequence determines to which hierarchy of the hierarchical processing sequences is executed in response to the communication state when stopping the speech recognition sequence, wherein a first hierarchical processor is a sound source localizer which calculates a sound source direction of each sound source from a speech signal of a plurality of channels, a second hierarchical processor is a sound source separator which separates the speech signal of the plurality of channels into sound source-specific speech signals of each of the sound sources, and a third hierarchical processor is a feature quantity calculator which calculates acoustic feature quantities from the sound source-specific speed signals.

* * * * *